United States Patent
Fukuda et al.

(10) Patent No.: US 11,145,432 B2
(45) Date of Patent: *Oct. 12, 2021

(54) CONDUCTOR, CONDUCTIVE COMPOSITION AND LAMINATE

(71) Applicant: Mitsubishi Chemical Corporation, Tokyo (JP)

(72) Inventors: Hiroya Fukuda, Toyohashi (JP); Osamu Numata, Toyohashi (JP); Hironobu Ikeda, Otake (JP); Toshio Nagasaka, Toyohashi (JP); Shinji Saiki, Otake (JP); Hiroaki Iriyama, Otake (JP); Masashi Uzawa, Toyohashi (JP); Asako Kaneko, Toyohashi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 169 days.

This patent is subject to a terminal disclaimer.

(21) Appl. No.: 15/899,532

(22) Filed: Feb. 20, 2018

(65) Prior Publication Data

US 2018/0174698 A1 Jun. 21, 2018

Related U.S. Application Data

(63) Continuation of application No. 14/397,957, filed as application No. PCT/JP2013/070055 on Jul. 24, 2013, now Pat. No. 10,096,395.

(30) Foreign Application Priority Data

Jul. 24, 2012 (JP) .............................. JP2012-163295
Sep. 21, 2012 (JP) .............................. JP2012-208466

(Continued)

(51) Int. Cl.
*H01B 1/12* (2006.01)
*C09D 179/02* (2006.01)
(Continued)

(52) U.S. Cl.
CPC ............. *H01B 1/124* (2013.01); *C08F 20/52* (2013.01); *C08F 26/06* (2013.01);
(Continued)

(58) Field of Classification Search
CPC .... H01B 1/128; H01B 1/124; C08G 73/0266; C09D 5/24
See application file for complete search history.

(56) References Cited

U.S. PATENT DOCUMENTS 4,956,441 A 9/1990 Kathirgamanthan et al.
5,256,454 A 10/1993 Murai et al.
(Continued)

FOREIGN PATENT DOCUMENTS

CN 1433442 A 7/2003
EP 0 844 284 A1 5/1998
(Continued)

OTHER PUBLICATIONS

JP-2011208016-A Translation (Year: 2011).*
(Continued)

*Primary Examiner* — Jasper Saberi
(74) *Attorney, Agent, or Firm* — Oblon, McClelland, Maier & Neustadt, L.L.P.

(57) ABSTRACT

The present invention relates to a conductor having a substrate and a conductive coating film laminated on the substrate, wherein, the surface resistance value of the conductive coating film is $5\times10^{10} \Omega/\square$ or less, the Ra1 of the conductive coating film is 0.7 nm or less, the Ra2 value of the conductive coating film scanning probe microscopies 0.35 nm or less, and the conductive coating film is formed with a conductive composition containing a conductive polymer (A). In addition, the present invention relates to a conductive composition which contains a conductive polymer (A) and a surfactant (B), wherein the surfactant (B)

(Continued)

contains a specific water-soluble polymer (C), and the content of a compound (D1) with an octanol-water partition coefficient (Log Pow) of 4 or more in the conductive composition is 0.001 mass % or less, relative to the total mass of the conductive composition.

1 Claim, 1 Drawing Sheet

(30) Foreign Application Priority Data

Apr. 19, 2013 (JP) .............................. JP2013-088485
May 10, 2013 (JP) .............................. JP2013-100736

(51) Int. Cl.
    C08G 73/02    (2006.01)
    C08F 20/52    (2006.01)
    C08F 26/06    (2006.01)
    C09D 5/24     (2006.01)
(52) U.S. Cl.
    CPC ........... *C08G 73/0266* (2013.01); *C09D 5/24* (2013.01); *C09D 179/02* (2013.01); *H01B 1/128* (2013.01); *Y10T 428/24355* (2015.01)

(56) References Cited

U.S. PATENT DOCUMENTS

| | | | |
|---|---|---|---|
| 5,589,108 A | 12/1996 | Shimizu | |
| 6,024,895 A | 2/2000 | Shimizu et al. | |
| 6,783,989 B1* | 8/2004 | Zakin ................... | G01N 33/523 422/82.01 |
| 7,144,525 B2 | 12/2006 | Yoshikawa et al. | |
| 2003/0157369 A1 | 8/2003 | Yoshikawa et al. | |
| 2003/0208014 A1 | 11/2003 | Kerres et al. | |
| 2006/0131546 A1 | 6/2006 | Yoshikawa et al. | |
| 2007/0181857 A1* | 8/2007 | Nishioka .................. | C08L 65/00 252/500 |
| 2008/0017852 A1 | 1/2008 | Huh et al. | |
| 2009/0080143 A1 | 3/2009 | Kobayashi | |
| 2010/0009296 A1 | 1/2010 | Kon | |
| 2010/0080964 A1* | 4/2010 | Kano .................... | C08F 220/28 428/195.1 |
| 2011/0143283 A1* | 6/2011 | Ohki ...................... | G03F 7/2059 430/296 |
| 2011/0309308 A1 | 12/2011 | Meguro | |
| 2014/0043731 A1 | 2/2014 | Yamada et al. | |
| 2015/0008372 A1* | 1/2015 | Nishita ................ | C09D 179/02 252/500 |

FOREIGN PATENT DOCUMENTS

| | | |
|---|---|---|
| EP | 0844284 A1 | 5/1998 |
| EP | 2 138 897 A1 | 12/2009 |
| JP | 61-197633 | 9/1986 |
| JP | 63-39916 | 2/1988 |
| JP | 1-301714 | 12/1989 |
| JP | 4-32848 | 2/1992 |
| JP | 4-268331 | 9/1992 |
| JP | 4-328181 | 11/1992 |
| JP | 5-503953 | 6/1993 |
| JP | 5-171010 | 7/1993 |
| JP | 5-178989 | 7/1993 |
| JP | 5-504153 | 7/1993 |
| JP | 5-226238 | 9/1993 |
| JP | 6-3813 A | 1/1994 |
| JP | 6-32845 | 2/1994 |
| JP | 6-56987 | 3/1994 |
| JP | 6-87949 | 3/1994 |
| JP | 6-145386 | 5/1994 |
| JP | 6-256516 | 9/1994 |
| JP | 6-293828 | 10/1994 |
| JP | 7-41756 | 2/1995 |
| JP | 7-48436 | 2/1995 |
| JP | 7-118524 | 5/1995 |
| JP | 7-196791 | 8/1995 |
| JP | 7-196791 A | 8/1995 |
| JP | 7-324132 | 12/1995 |
| JP | 7-324132 A | 12/1995 |
| JP | 8-109351 A | 4/1996 |
| JP | 9-22833 A | 1/1997 |
| JP | 10-158395 A | 6/1998 |
| JP | 11-203937 | 7/1999 |
| JP | 2000-79662 A | 3/2000 |
| JP | 2001-98069 A | 4/2001 |
| JP | 2002-174899 A | 6/2002 |
| JP | 2002-226721 | 8/2002 |
| JP | 2002226721 A * | 8/2002 |
| JP | 2003-213148 A | 7/2003 |
| JP | 2003-308733 A | 10/2003 |
| JP | 2006-117925 | 5/2006 |
| JP | 2006-301073 A | 11/2006 |
| JP | 2007-194109 A | 8/2007 |
| JP | 2007-264118 A | 10/2007 |
| JP | 2008-38147 | 2/2008 |
| JP | 2008-95060 A | 4/2008 |
| JP | 2008-171823 A | 7/2008 |
| JP | 2008-174598 A | 7/2008 |
| JP | 2010-67448 A | 3/2010 |
| JP | 2010-116441 | 5/2010 |
| JP | 2010-116441 A | 5/2010 |
| JP | 201 1-1 26957 | 6/2011 |
| JP | 2011-131409 A | 7/2011 |
| JP | 2011-208016 | 10/2011 |
| JP | 2011208016 A * | 10/2011 |
| JP | 2011-219680 | 11/2011 |
| TW | 200641918 A | 12/2006 |
| TW | 201302854 A1 | 1/2013 |
| WO | 87/05914 A1 | 10/1987 |
| WO | 91/05979 A1 | 5/1991 |
| WO | 91/06887 A1 | 5/1991 |
| WO | WO97/07167 A1 | 2/1997 |
| WO | WO 2008/114411 A1 | 9/2008 |
| WO | 2012/144608 A1 | 10/2012 |
| WO | WO 2012/144608 A1 | 10/2012 |

OTHER PUBLICATIONS

JP-2002226721-A English translation, 2002 (Year: 2002).*
International Search Report dated Nov. 19, 2013, in PCT/JP2013/070055, filed Jul. 24, 2013.
"Catalogue of OLS3500", Olympus; Your Vision, Our Future, http://www.olympus.co.jp/jp/news/2004b/nr040830ols35j.jsp?&print, Aug. 30, 2004, 2 pages (with partial English translation).
Office Action dated Jun. 1, 2016 in Korean Patent Application No. 10-2014-7027524 (with English language translation).
Combined Taiwanese Office Action and Search Report dated Dec. 30, 2016 in Taiwanese Patent Application No. 102126503 (with English language translation of the Search Report).
Office Action dated Feb. 21, 2017 in Japanese Patent Application No. 2013-536736 (with unedited computer generated English translation).
Notice of Allowance dated Oct. 17, 2017 in Japanese Patent Application No. 2013-536736 (with English language translation).
Uzawa, JP2006301073A_translation.
Uzawa, JP2003308733A_translation.
"Trimethanolamine", CS ChemProp, Feb. 21, 2017.
Office Action dated Jul. 31, 2018 in Japanese Patent Application No. 2017-121746, with unedited computer generated English translation obtained by Global Dossier on Aug. 1, 2018, 11 pages.
Japanese Office Action dated May 14, 2019 in Patent Application No. 2017-121746, 4 pages (with unedited computer generated English translation).
International Search Report dated Aug. 26, 2014 in PCT/JP2014/063069 (with English language translation).
Dennis E. Tallman, et al., "Preparation and preliminary characterization of a poly(4-vinylpyridine) complex of a water-soluble polyaniline" Synthetic Metals, vol. 90, No. 1, 1997, pp. 13-18.

(56) References Cited

OTHER PUBLICATIONS

Isao Yamaguchi, et al., "Synthesis of 4,4'-bipyridinium salts of poly(2-methoxyaniline-5-sulfonic acid) and their self-doping and chemical properties" Reactive and Functional Polymers, vol. 69, No. 2, 2009, pp. 91-96.
Combined Office Action and Search Report dated Jun. 10, 2015 in Taiwanese Patent Application No. 103117350 (with English language translation).
U.S. Office Action dated Aug. 29, 2017 in U.S. Appl. No. 14/890,763.

* cited by examiner

CONDUCTOR, CONDUCTIVE COMPOSITION AND LAMINATE

The present application is a continuation of U.S. patent application Ser. No. 14/397,957, filed Oct. 30, 2014, which is a National Stage of PCT/JP2013/070055, filed Jul. 24, 2013, the disclosures of which are incorporated herein by reference in their entireties. The present invention is based upon and claims the benefit of priority to the following Japanese Patent Applications: No. 2012-163295, filed Jul. 24, 2012; No. 2012-208466, filed Sep. 21, 2012; No. 2013-088485, filed Apr. 19, 2013; and No. 2013-100736, filed May 10, 2013.

TECHNICAL FILED

The present invention relates to a conductive composition, a conductor and a laminate.

BACKGROUND ART

Patterning technologies using charged particle beams such as electron beams and ion beams are expected as the next-generation technology to replace photolithography.

To enhance productivity when charged particle beams are used, it is important to improve the sensitivity of resist. Thus, the mainstream approach in the technical field is to use a highly sensitive chemically amplified resist, in which acid is generated in the portions exposed to light or irradiated by charged particle beams, and then to facilitate crosslinking reactions or decomposition reactions by applying heat known as post-exposure bake (PEB).

Also, as the patterns in semiconductor devices have become more microscopic in recent years, controlling resist patterns on a scale of several nanometers has been required.

When patterns are formed using charged particle beams, especially on an insulative substrate, electric fields generated by electrical charge-up in the substrate may cause the orbit of charged particle beams to be curved, and desired patterns are hard to obtain.

Therefore, to solve such a problem, a technology such as follows is known to be effective: a conductive composition containing a conductive polymer is applied on a resist surface to form conductive coating film so that the resist surface is coated by the conductive film.

As for a method for forming a conductive coating film on the surface of the resist-layer in electron-beam lithography, coating a conductive composition containing a water-soluble conductive polymer and a surfactant on a resist layer (substrate) is known. For example, Patent Literature 1 (JP2002-226721A) discloses a conductive composition containing a water-soluble conductive polymer having a sulfonic acid group and/or a carboxyl group, a water-soluble polymer having a nitrogen-containing functional group and a terminal hydrophobic group with a weight average molecular weight of 1000 to 1500, and a solvent.

Meanwhile, when a contaminant is contained in the above conductive composition, problems such as line disconnection may occur after patterns are formed by using electron beams. Thus, before applying on a resist layer, the conductive composition is put through microfiltration using a filter with a hydrophobic membrane. However, clogging occurs frequently during microfiltration of the conductive composition described in Patent Literature 1, causing problems such as replacing the filter each time it clogs.

Also, when a conductive composition containing a conductive polymer is applied as an antistatic agent in an electron-beam lithographic process of a semiconductor, the coating performance of the conductive composition and its effect on a substrate or the resist coated on the substrate are known to be in a tradeoff relationship.

For example, when additives such as an anionic or a cationic surfactant are added to improve the coating performance of a conductive composition, the acid or base derived from the surfactant adversely affects the resist properties, thus causing problems such as failure of a predetermined pattern to be formed.

In addition, as an antistatic agent applicable to a next-generation process for semiconductor devices, a conductive composition is required to be capable of forming conductive coating film with surface roughness on which even more complicated and fine patterns can be formed, namely, coating film with less surface roughness.

However, in the conductive composition described in Patent Literature 1, it has a problem that cannot use for the resist surface in a next-generation process because the surface of the conductive coating film is too rough.

Also, when the conductor containing the conductive composition of Patent Literature 1 is used for a longer period of time under a temperature of 100° C. or higher, the resist laminate or the like coated on a substrate tends to corrode, causing problems such as a reduction in film thickness when applied on a positive resist, for example.

As described above, conventional technologies have not provided conductive compositions which exhibit excellent coating performance and surface roughness of a conductive coating film, while showing less impact on the resist layer, so as to be applicable to a next-generation process for semiconductor devices.

In addition, as a conductive polymer capable of expressing conductivity without adding a doping agent, self-doped polyanilines having acidic substituents are known. Here, "self-doped" means that a dopant is present in its own structure and is capable of doping without the addition of any doping agent.

To synthesize a self-doped polyaniline having acidic substituents, a method is proposed to polymerize aniline having acidic substituents, for example, aniline with a sulfonic acid group or aniline having a carboxyl group, using an oxidizing agent in the presence of a basic reaction auxiliary.

Conventionally, a polyaniline having acidic substituents is known to be hard to polymerize by itself and thus it has been difficult to produce aniline with a high-molecular-weight. However, using a polymerization method conducted in the presence of a basic reaction auxiliary, a high-molecular-weight polymer can be produced.

Moreover, an acidic-group-substituted polyaniline obtained by the above method exhibits excellent solubility in both acidic and alkaline solutions.

However, when a polyaniline having acidic substituents is polymerized using an oxidizing agent in the presence of a basic reaction auxiliary, a conductive polymer is usually obtained as a reaction mixture that contains residual monomers as well as byproducts generated through side reactions, such as oligomers, acidic substance (sulfate ions or the like, which are decomposed products of monomers or oxidizing agent), basic substance (ammonium ions or the like, which are decomposed products of basic reaction auxiliary or oxidizing agent) and the like. Thus, the degree of purity has not always been high.

In addition, due to its molecular weight and physical properties such as strong base properties, the basic substance cannot steadily neutralize the acidic group of a polyaniline having acidic substituents. Thus, the acidic group site of the polyaniline having acidic substituents tends to be subject to hydrolysis and is unstable. Accordingly, when a polyaniline having acidic substituents is coated on a resist layer and heat is applied on the coated resist layer to form a conductive coating film, the acidic group tends to be easily eliminated.

In the present application, residual monomers and sulfate ions, as well as the acidic group eliminated from a polyaniline having acidic substituents, are collectively referred to as "acidic substances."

Therefore, when a polyaniline having acidic substituents is applied to a chemically amplified resist, and when exposure-to-light, PEB treatment and development are conducted while the conductive coating film (conductive film) remains on the resist layer, the acidic substances or basic substances tend to migrate to the resist layer. As a result, deformation of patterns, variations in sensitivity or the like occur, adversely affecting the resist layer.

More specifically, if a resist layer is a positive type, when acidic substances migrate from the conductive coating film to the resist layer, the unexposed part of the resist layer is dissolved during development, causing a reduction in film thickness of the resist layer, narrowed patterns, sensitivity change toward a higher sensitivity range and the like.

On the other hand, when base substances migrate from the conductive coating film to the resist layer, the acid component of the exposed part is deactivated, causing change in patterns, sensitivity change toward a lower sensitivity range, and the like.

Also, if a resist layer is a negative type, migration of byproducts from the conductive coating film to the resist layer will cause an opposite result in each of the above.

Accordingly, to stabilize the acidic group of the polyaniline having acidic substituents, Patent Literature 2 (JP2011-219680A), for example, proposes a method for neutralizing the acidic group site by adding a basic compound to a conductive polymer solution from which byproducts or the like have been removed by an ion-exchange method.

According to the method described in Patent Literature 2, by adding a basic compound after byproducts or the like have been removed, the basic compound forms salts with the acidic group of the polyaniline having acidic substituents, thereby preventing elimination of the acidic group. Moreover, a basic compound tends to form salts through reactions with residual monomers or sulfate ions. Thus, migration of acidic substances from the conductive coating film to the resist layer is suppressed.

Furthermore, the patent literature discloses that if quaternary ammonium compounds such as tetramethylammonium hydroxide (TMAH) or tetraethylammonium hydroxide (TEAH) are used as a basic compound, a reduction in the film thickness of a chemically amplified resist is prevented and the heat resistance of the conductive composition is enhanced.

Also, Patent Publication 3 (JP H5-171010A) discloses that a conductive polymer solution is stabilized if a diamine compound such as urea is added as a basic compound. Patent Publication 4 (JP 2006-117925A) discloses that adding a divalent or higher aliphatic basic compound to a conductive polymer prevents a reduction in the film thickness of a chemically amplified resist. Moreover, Patent Literature 5 (JP 2010-116441A) discloses that adding an inorganic salt such as sodium hydroxide enhances the heat resistance of the conductive composition.

Further, Patent Literature 6 (PCT Publication WO2012/144608) discloses if 0.3 to 0.5 mol equivalent of tris(hydroxymethyl)aminomethane is added to 1 mol of a unit having an acidic group among the units of a conductive polymer, the heat resistance of the conductive coating film is improved.

However, using methods for adding a basic compound to a conductive polymer solution described in Patent Literatures 2 to 6, migration of acidic substances from the conductive coating film to the resist layer can be suppressed to a certain degree, but such migration needs to be suppressed even further to satisfy the level of performance required as wiring in semiconductor devices has become even finer in recent years. In addition, methods described in Patent Literatures 2 to 6 are not sufficient to suppress elimination of the acidic group from an acidic-group-substituted polyaniline.

DOCUMENTS OF RELATED ART PATENT LITERATURE

[Patent Literature 1]: JP 2002-226721A
[Patent Literature 2]: JP 2011-219680A
[Patent Literature 3]: JP H5-171010A
[Patent Literature 4]: JP 2006-117925A
[Patent Literature 5]: JP 2010-116441A
[Patent Literature 6]: PCT Publication WO2012/144608

DISCLOSURE OF INVENTION

Problems to be Solved by the Invention

Recently, as wiring in semiconductor devices has become even finer, controlling resist patterns on a scale of several nanometers has been required. More specifically, adverse effects from the conductive coating film on the resist are required to be reduced.

What has been in demand are conductors provided with a conductive coating film that has less surface roughness, namely, surface roughness applicable to a next-generation process for semiconductor devices.

However, in conductors each provided with a conductive coating film formed by using a conductive composition described in Patent Literatures 1 to 6, a reduction in "roughness" on the surface of the conductive coating film is not sufficient, and further improvements are necessary to satisfy properties required in a next-generation process for semiconductor devices.

Therefore, an aspect of the present invention is to provide a conductor capable of preventing a reduction in the thickness of a resist layer while exhibiting surface roughness applicable to a next-generation process for semiconductor devices.

Here, "reduction in the thickness of a resist layer" indicates adverse impact from acidic substances derived from a conductive coating film or from a surfactant, and is measured by film reduction testing.

Another aspect of the present invention is to provide a conductive composition containing a surfactant that is capable of reducing clogging in a filter used for filtration of a conductive composition.

In addition, another aspect of the present invention is to provide a conductive composition that exhibits excellent coating performance and conductivity, lowers a reduction in the film thickness of a resist layer, and is capable of forming a conductive coating having surface roughness applicable to a next-generation process for semiconductor devices.

In addition, another aspect of the present invention is to provide a conductive composition capable of forming a conductive coating film from which acidic substances are less likely to migrate to the resist layer.

Solutions to the Problems

The inventors of the present invention have carried out intensive studies and found that a conductor formed with a conductive composition having the following properties is capable of solving the problems described above: namely, the conductor has a substrate and a conductive coating film; the surface resistance value of the conductive coating film is $5 \times 10^{10} \Omega/\square$ or less; the surface roughness (Ra1 value) of the conductive coating film measured by a stylus profiler is at or below a specific value; the surface roughness (Ra2 value) of the conductive coating film measured by a scanning probe microscope is at or below a specific value; and the conductive coating film is formed with a conductive composition that contains a specific conductive polymer (A).

Namely, a first embodiment of the present invention is a conductor has a substrate and a conductive coating film laminated on the substrate. The surface resistance value of the conductive coating film is $5 \times 10^{10} \Omega/\square$ or less, the surface roughness (Ra1 value) of the conductive coating film measured by a stylus profiler is 0.7 nm or less, the surface roughness (Ra2 value) of the conductive coating film measured by a scanning probe microscope is 0.35 nm or less, and the conductive coating film is formed with a conductive composition containing a conductive polymer (A).

Moreover, in the conductor according to the first embodiment of the present invention, the conductive polymer (A) is preferred to have an acidic group. In addition, the acidic group is preferred to be at least one acidic group selected from the group consisting of sulfonic acid groups and carboxyl groups.

In addition, in the conductor according to the first embodiment of the present invention, the conductive polymer (A) is preferred to have a monomer unit represented by the following general formula (1).

[Chemical formula 1]

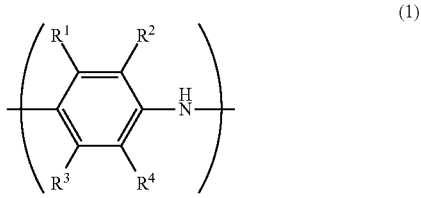

(1)

(In formula (1), $R^1$ to $R^4$ each independently indicate a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof. Also, an acidic group represents a sulfonic acid group or a carboxyl group.)

Furthermore, the inventors have found that clogging of a filter during microfiltration of a conductive composition is caused when a compound contained in the surfactant of the conductive composition has an octanol/water partition coefficient (Log Pow) of 4 or more.

Therefore, the inventors have carried out intensive studies and found that a conductive composition containing a surfactant, which was reduced the content of a compound with an octanol/water partition coefficient (Log Pow) of 4 or more until a certain value or less, is capable of solving the above problem.

Namely, a conductive composition according to a second embodiment of the present invention contains a conductive polymer (A) and a surfactant (B), and is characterized in that the surfactant (B) contains a water-soluble polymer (C) having a nitrogen-containing functional group and a terminal hydrophobic group; and the content of a compound (D1) with an octanol/water partition coefficient (Log Pow) of 4 or more in the conductive composition is 0.001 mass % or less, relative to the total mass of the conductive composition.

In addition, the water-soluble polymer (C) is preferred to have a vinyl monomer unit having a nitrogen-containing functional group in the molecule.

Furthermore, the inventors have found that by increasing the weight-average molecular weight of a water-soluble polymer (C) having a nitrogen-containing functional group and a terminal hydrophobic group, the obtained conductive composition can maintain excellent coating properties while decreasing adverse impact on the resist layer, and is capable of forming a conductive coating film with surface roughness applicable to a next-generation process for semiconductor devices.

Namely, the conductive composition according to a third embodiment of the present invention is characterized in that the water-soluble polymer (C) in the surfactant (B) contained in the conductive polymer of the second embodiment is a water-soluble polymer (C1) having a nitrogen-containing functional group and a terminal hydrophobic group and with the weight-average molecular weight of 2000 or more.

Furthermore, the inventors have found that when a conductive composition contains the conductive polymer (A), two or more tertiary amines and a basic compound with a cyclic structure, that is, a conjugated structure in the molecule while having, such a conductive composition can suppress migration of acidic substances to the resist layer.

Namely, the conductive composition according to a fourth embodiment of the present invention contains a conductive polymer (A1) and a basic compound (E1), and is characterized in that the basic compound (E1) has a conjugated structure and two or more tertiary amines in the molecule thereof.

By suppressing migration of acidic substances from the conductive coating film to the resist layer, a reduction in the film thickness of the resist layer is suppressed.

Furthermore, the inventors have found that if a conductive composition contains a conductive polymer having an acidic group and a specific basic compound, such a conductive composition is capable of forming a conductive coating film from which acidic substances are less likely to migrate to the resist layer.

Namely, the conductive composition according to a fifth embodiment of the present invention contains a conductive polymer (A) and a basic compound (E2), and is characterized in that the basic compound (E2) is a quaternary ammonium compound in which at least one of the four groups bonded to a nitrogen atom is an alkyl group having 3 or more carbon atoms.

Furthermore, the conductive composition according to a sixth embodiment of the present invention contains a conductive polymer (A) and a basic compound (E3), and is characterized by the following: the conductive polymer (A) contains a monomer unit having an acidic group; the basic compound (E3) has a basic group and two or more hydroxyl groups in the molecule thereof and the melting point of the basic compound (E3) is 30° C. or higher; and the content of the basic compound (E3) in the conductive composition is 0.6 to 0.8 mol, relative to 1 mol of the monomer unit having an acidic group of the conductive polymer (A).

Furthermore, a seventh embodiment of the present invention is a laminate having a substrate, a conductive coating film and an electron-beam resist film. In such a laminate, the electron-beam resist film is laminated on the substrate, the conductive coating film is laminated on the electron-beam resist film, the surface resistance value of the laminate is $5 \times 10^{10} \Omega/\square$ or less, the surface roughness (Ra1 value) of the conductive coating film measured by a stylus profiler is 0.7 nm or less, the surface roughness (Ra2 value) of the conductive coating film measured by a scanning probe microscope is 0.35 nm or less, and the conductive coating film is formed with a conductive composition containing a conductive polymer (A).

Namely, the present invention relates to the following:

[1] A conductor having a substrate and a conductive coating film laminated on the substrate, wherein the surface resistance value of the conductive coating film is $5 \times 10^{10} \Omega/\square$ or less, the surface roughness (Ra1 value) of the conductive coating film measured by a stylus profiler is 0.7 nm or less, the surface roughness (Ra2 value) of the conductive coating film measured by an optical a scanning probe microscope is 0.35 nm or less, and the conductive coating film is formed with a conductive composition containing a conductive polymer (A);

[2] The conductor described in [1], wherein the conductive polymer (A) has an acidic group;

[3] The conductor described in [2], wherein the acidic group is at least one acidic group selected from the group consisting of sulfonic acid groups and carboxyl groups;

[4] The conductor described in [1], wherein the conductive polymer (A) has a monomer unit represented by the following general formula (1);

[Chemical formula 2]

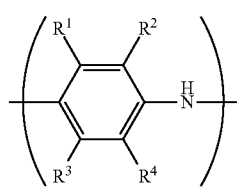

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

[5] A conductive composition containing a conductive polymer (A) and a surfactant (B), wherein the surfactant (B) contains a water-soluble polymer (C) having a nitrogen-containing functional group and a terminal hydrophobic group, and the content of a compound (D1) with an octanol/water partition coefficient (Log Pow) of 4 or more in the conductive composition is 0.001 mass % or less, relative to the total mass of the conductive composition;

[6] The conductive composition described in [5], wherein the water-soluble polymer (C) is a water-soluble polymer (C1) having a nitrogen-containing functional group and a terminal hydrophobic group and with the weight-average molecular weight of 2000 or more;

[7] The conductive composition described in [6], wherein the water-soluble polymer (C) contains a vinyl monomer unit having a nitrogen-containing functional group in the molecule;

[8] The conductive composition described in [5], wherein the conductive polymer (A) has a monomer unit represented by the following general formula (1);

[Chemical formula 3]

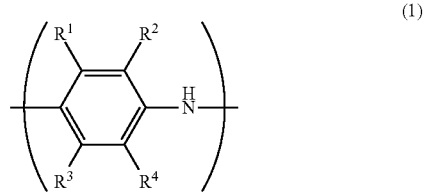

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

[9] The conductive composition described in [5], wherein the conductive polymer (A) contains at least one acidic group selected from the group consisting of sulfonic acid groups and carboxyl groups;

[10] A conductive composition containing a conductive polymer (A1) and a basic compound (E1), wherein the basic compound (E1) has a conjugated structure and two or more tertiary amines in the molecule;

[11] The conductive composition described in [10], wherein the conductive polymer (A1) has a monomer unit represented by the following general formula (1);

[Chemical formula 4]

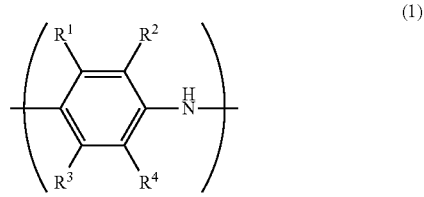

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

[12] The conductive composition described in [10], wherein the conductive polymer (A1) contains at least one acidic group selected from the group consisting of sulfonic acid groups and carboxyl groups;

[13] A conductive composition containing a conductive polymer (A) and a basic compound (E2), wherein the basic compound (E2) is a quaternary ammonium compound in which at least one of the four groups bonded to a nitrogen atom is an alkyl group having 3 or more carbon atoms;

[14] The conductive composition described in [13], wherein the conductive polymer (A) has a monomer unit represented by the following general formula (1);

[Chemical formula 5]

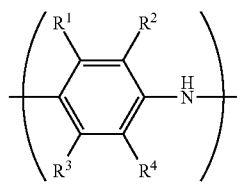

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

[15] The conductive composition described in [13], wherein the conductive polymer (A) contains at least one acidic group selected from the group consisting of sulfonic acid groups and carboxyl groups;

[16] A conductive composition containing a conductive polymer (A) and a basic compound (E3), wherein the conductive polymer (A) contains a monomer unit having an acidic group, the basic compound (E3) has a basic group and two or more hydroxyl groups in the molecule, the melting point of the basic compound (E3) is 30° C. or more, and the content of the basic compound (E3) in the conductive composition is 0.6 to 0.8 mol relative to 1 mol of the monomer unit having an acidic group of the conductive polymer (A);

[17] The conductive composition described in [16], wherein the monomer unit having an acidic group of the conductive polymer (A) is represented by the following general formula (1) w;

[Chemical formula 6]

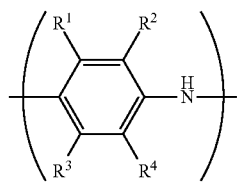

(1)

(In formula (1), $R^1$ to $R^4$ each independently represent a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

[18] The conductive composition described in [16], wherein the acidic group is at least one acidic group selected from the group consisting of sulfonic acid groups and carboxyl groups;

[19] The conductive composition described in any one of [10] to [18], further containing a surfactant (B);

[20] The conductive composition described in [19], wherein the surfactant (B) contains a water-soluble polymer (C) having a nitrogen-containing functional group and a terminal hydrophobic group, and the content of a compound (D1) with an octanol/water partition coefficient (Log Pow) of 4 or more in the conductive composition is 0.001 mass % or less, relative to the total mass of the conductive composition; and

[21] A laminate having a substrate, a conductive coating film and an electron-beam resist film, wherein the electron-beam resist film is laminated at least on one surface of the substrate, the conductive coating film is laminated on the electron-beam resist film, the surface resistance value of the conductive coating film is $5 \times 10^{10} \Omega/\square$ or less, the surface roughness (Ra1 value) of the conductive coating film measured by a stylus profiler is 0.7 nm or less, the surface roughness (Ra2 value) of the conductive coating film measured by a scanning probe microscope is 0.35 nm or less, and the conductive coating film is formed with a conductive composition containing a conductive polymer (A).

Effects of the Invention

A conductor according to the first embodiment of the present invention is applicable to a next-generation process for semiconductor devices, since a reduction in the film thickness of the resist layer is small when such a conductor is used.

The conductive composition according to the second embodiment of the present invention exhibits excellent performance when passing through hydrophobic membranes during the filtration process, and thus the frequency of replacing filters is reduced.

In addition, the conductive composition according to the third embodiment of the present invention exhibits excellent coating performance and conductivity. When such a conductive composition is used for forming a conductive coating film, a reduction in the film thickness of the laminate such as a resist coated on a substrate is small regardless of conditions of its environment such as temperature, and the coating film shows less surface roughness, namely, surface roughness applicable to a next-generation process for semiconductor devices. Thus, it is very useful in industrial applications.

In addition, the conductive composition according to the third embodiment of the present invention is capable of forming a conductor having an insoluble or removable soluble conductive coating film (conductive polymer film) by applying heat after the conductor is formed.

Accordingly, the conductive composition is applicable to forming a permanent anti-static film as well as a temporary anti-static film used during the production process.

Furthermore, the conductive composition according to the fourth embodiment of the present invention is capable of suppressing a reduction in the film thickness of the resist layer by controlling migration of acidic substances from the conductive coating film to the resist layer.

Conductive compositions according to the fifth and sixth embodiments of the present invention are capable of forming conductive coating films from which acidic substances are less likely to migrate to the resist layer.

In addition, conductive coating films obtained by using conductive compositions of the fifth and six embodiments of the present invention are capable of reducing or suppressing migration of acidic substances to the resist layer.

DETAILED DESCRIPTION OF THE PREFERRED EMBODIMENTS

In the following, the embodiments of the present invention are described in detail.

In the present application, "conductivity" indicates having a surface resistance value of $5.0 \times 10^{10} \Omega/\square$ or less.

In addition, "dissolubility" in the present application indicates that at least 0.1 gram of a substance is homogeneously dissolved in 10 grams (liquid temperature of 25° C.) of water, water containing a base and/or a basic salt, water containing acid, or a mixture of water and a water-soluble organic solvent.

Also, "water-soluble" in the present application indicates dissolubility in water in relation to the "dissolubility" defined above.

<Conductor>

First, a conductor according to the first embodiment of the present invention is described.

A conductor of the first embodiment has a substrate and a conductive coating film laminated on the substrate. The conductor is characterized by the following: the surface resistance value of the conductive coating film is $5 \times 10^{10} \Omega/\square$ or less; the surface roughness (Ra1 value) of the conductive coating film measured by a stylus profiler is 0.7 nm or less; the surface roughness (Ra2 value) of the conductive coating film measured by a scanning probe microscope is 0.35 nm or less; and the conductive coating film is formed with a conductive composition containing a conductive polymer (A).

Figure 1:
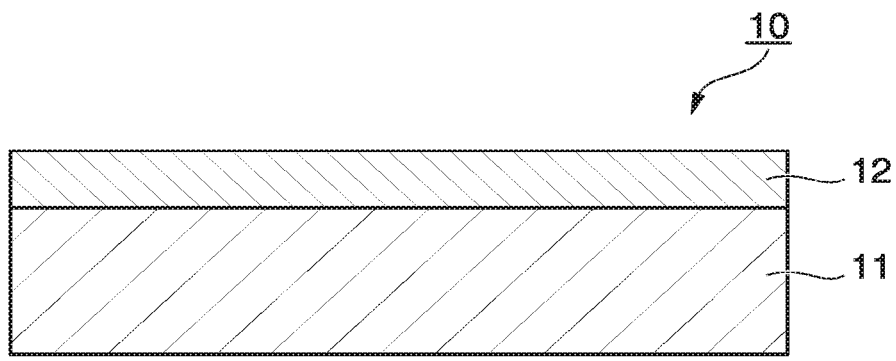
FIG. 1 is a cross-sectional view showing an example of the conductor related to the present invention.

FIG. 1 is a cross-sectional view showing one example of the conductor as the first embodiment. The Conductor 10 in this example is structured by laminating the conductive coating film 12 on the substrate 11.

In FIG. 1, the measurement ratio is different from the actual ratio for the convenience of description.

In the conductor of the first embodiment, a conductive polymer (A) is preferred to have an acidic group.

The acidic group is preferred to be at least one acidic group selected from the group consisting of sulfonic acid groups and carboxyl groups.

In addition, the conductive polymer (A) is preferred to have a monomer unit represented by the following general formula (1).

[Chemical formula 7]

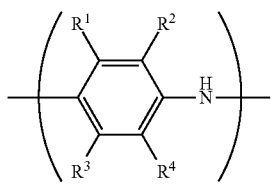

(1)

(In formula (1), $R^1$ to $R^4$ each independently represent a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

The surface resistance value of the conductive coating film of the first embodiment can be measured by using a surface resistivity meter.

The surface roughness (Ra1 value) of the conductive coating film indicates the value measured by a stylus profiler (instrument for measuring profile, surface roughness, and microscopic shapes).

In addition, the surface roughness (Ra2 value) of the conductive coating film indicates the value measured by a scanning probe microscope.

In the first embodiment of the present invention, the surface roughness (Ra1 value) of the conductive coating film is preferred to be 0.7 nm or less, more preferably 0.6 nm or less. In addition, the lower limit of the surface roughness (Ra1 value) is not limited specifically as long as the effects of the present invention are achieved. However, it is preferred to be 0.3 nm or more from the viewpoint of reliability of the measurement value. Namely, in the conductor according to the first embodiment of the present invention, the surface roughness (Ra1 value) is preferred to be 0.3 to 0.7 nm, more preferably 0.3 to 0.6 nm. The surface roughness (Ra1 value) of the conductive coating film is preferred to be within the above range, since the deposit of aforementioned compound (D1) is suppressed.

Moreover, in the first embodiment of the present invention, the surface roughness (Ra2 value) of the conductive coating film is preferred to be 0.35 nm or less, preferably 0.33 nm or less. In addition, the lower limit of the surface roughness (Ra2 value) is not limited specifically as long as the effects of the present invention are achieved. However, it is preferred to be 0.1 nm or more from the viewpoint of obtaining surface roughness of a wafer (substrate). Namely, in the conductor according to the first embodiment, the surface roughness (Ra2 value) is preferred to be 0.1 to 0.35 nm, more preferably 0.1 to 0.33 nm. The surface roughness (Ra2 value) of the conductive coating film is preferred to be within the above range, since roughness caused by salts formed by the conductive polymer and basic substances is suppressed.

(Conductive Polymer (A))

The conductor according to the first embodiment of the present invention is made of a conductive composition containing a conductive polymer (A). A conductive polymer (A) is preferred to have an acidic group. Examples of an acidic group are phosphate groups, sulfonic acid groups and carboxyl groups. Among those, the acidic group is preferred to be at least one acidic group selected from the group consisting of sulfonic acid groups and carboxyl groups from the viewpoint of processability.

As for a conductive polymer (A) having at least one acidic group selected from the group consisting of sulfonic acid groups and carboxyl groups, it is not limited specifically as long as the effects of the present invention are achieved. Any known conductive polymers may be used.

From the viewpoint of dissolubility, examples of such a conductive polymer are preferred to be those in JP S61-197633A, JP S63-39916A, JP H1-301714A, JP H5-504153A, JP H5-503953A, JP H4-32848A, JP H4-328181A, JP H6-145386A, JP H6-56987A, JP H5-226238A, JP H5-178989A, JP H6-293828A, JP H7-118524A, JP H6-32845A, JP H6-87949A, JP H6-256516A, JP H7-41756A, JP H7-48436A, and JP H4-268331A More specifically, examples of a conductive polymer (A) are π-conjugated conductive polymers containing, as a monomer unit, at least one type selected from the group consisting of phenylenevinylene, vinylene, thienylene, pyrrolylene, phenylene, iminophenylene, isothianaphthene, furylene, and carbazolylene in which their respective α-position or β-position is substituted by at least one acidic group selected from the group consisting of sulfonic acid groups and carboxyl groups.

When a π-conjugated conductive polymer contains at least one type of a monomer unit selected from the group consisting of iminophenylenes and carbazolylenes, examples of a conductive polymer are those having the following alkyl group on a nitrogen atom of the monomer unit: an alkyl group having at least one group selected from the group consisting of sulfonic acid groups and carboxyl groups; an alkyl group substituted with at least a group selected from the group consisting of sulfonic acid groups and carboxyl groups; or an alkyl group containing an ether bond.

Among the above, from the viewpoints of conductivity and dissolubility, it is preferred to use a conductive polymer (A) that contains at least one type selected from the group consisting of thienylene, pyrrolylene, iminophenylene, phenylenevinylene, carbazolylene and isothianaphthene as the monomer unit, whose β-position is substituted with at least a group selected from the group consisting of sulfonic acid groups and carboxyl groups.

Also, from the viewpoints of conductivity and dissolubility, a conductive polymer (A) is preferred to contain a polythiophene skeleton, polypyrrol skeleton, polyaniline skeleton, polyphenylenevinylene skeleton, or polyisothianaphthene skeleton. It is especially preferred if a conductive polymer (A) contains at least one type of a monomer unit selected from the group consisting of those represented by the following general formulas (2) to (4) at 20 to 100 mol % based on the total number of monomer units of the entire conductive polymer (A).

[Chemical formula 8]

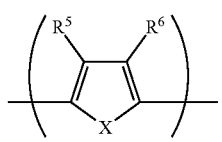

(2)

[Chemical formula 9]

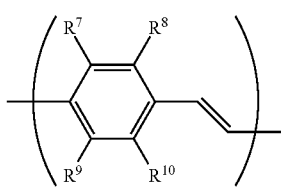

(3)

[Chemical formula 10]

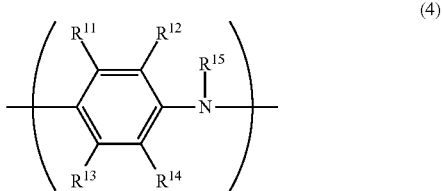

(4)

In general formulas (2) to (4) above, X indicates a sulfur atom or a nitrogen atom, $R^5$ to $R^{15}$ each independently indicates a hydrogen atom or a group selected from the group consisting of $-SO_3H$, $-R^{16}SO_3H$, $-OCH_3$, $-CH_3$, $-C_2H_5$, $-F$, $-Cl$, $-Br$, $-I$, $-N(R^{17})_2$, $-NHCOR^{17}$, $-OH$, $-O-$, $-SR^{17}$, $-OR^{17}$, $-OCOR^{17}$, $-NO_2$, $-COOH$, $-R^{16}COOH$, $-COOR^{17}$, $-COR^{17}$, $-CHO$ and $-CN$. Here, $R^{16}$ indicates an alkylene group, an arylene group, or an aralkylene group having 1 to 24 carbon atoms, and $R^{17}$ indicates an alkyl group, aryl group or aralkyl group.

However, at least one each of $R^5$ to $R^6$ of general formula (2), $R^7$ to $R^{10}$ of general formula (3) and $R^{11}$ to $R^{15}$ of general formula (4) is a group selected from the group consisting of $-SO_3H$, $-R^{16}SO_3H$, $-COOH$, $-R^{16}COOH$, or their alkali metal salts, ammonium salts and substituted ammonium salts.

Examples of alkali metal salts are lithium salts, sodium salts, potassium salts and the like.

More specifically, alkali metal salts are, for example, lithium sulfate, lithium carbonate, lithium hydroxide, sodium sulfate, sodium carbonate, sodium hydroxide, potassium sulfate, potassium carbonate, potassium hydroxide and derivatives with their skeletons.

Examples of substituted ammonium salts are aliphatic ammonium salts, saturated alicyclic ammonium salts, unsaturated alicyclic ammonium salts and the like.

An example of aliphatic ammonium salt is ammonium represented by the following general formula (III).

[Chemical formula 11]

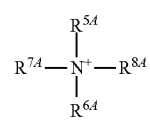

(III)

Specific examples of an aliphatic ammonium represented by general formula (III) above are: methylammonium, dimethylammonium, trimethylammonium, ethylammonium, diethylammonium, triethylammonium, methylethylammonium, diethylmethylammonium, dimethylethylammonium, propylammonium, dipropylammonium, isopropylammonium, diisopropylammonium, butyl ammonium, dibutylammonium, methylpropylammonium, ethyl propylammonium, methylisopropylammonium, ethylisopropylammonium, methylbutylammonium, ethylbutylammonium, tetramethylammonium, tetramethylolammonium, tetraethylammonium, tetra-t-butyl ammonium, tetra-sec-butylammonium, and tetra-t-butylammonium. Among those, at least any one of $R^{5A}$ to $R^{8A}$ is preferred to be a hydrogen atom, and the rest are each preferred to be an alkyl group having 1 to 4 carbon atoms. It is more preferred if any two of $R^{5A}$ to $R^{8A}$ are each a hydrogen atom, and the rest are each an alkyl group having 1 to 4 carbon atoms.

Examples of saturated alicyclic ammonium salts are piperidinium, pyrrolidinium, morpholinium, piperazinium and derivatives with their skeletons.

Examples of unsaturated alicyclic ammonium salts are pyridinium, α-picolinium, β-picolinium, γ-picolinium, quinolinium, isoquinolinium, pyrrolinium, and derivatives with their skeletons.

In the conductive composition to form a conductor of the first embodiment, a conductive polymer (A) is preferred to further contain a monomer unit represented by the following general formula (1).

[Chemical formula 12]

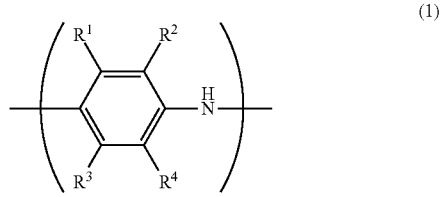

(1)

(In formula (1), $R^1$ to $R^4$ each independently represent a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof. Here, an acidic group means a sulfonic acid group or a carboxyl group.)

Here, a sulfonic acid group and a carboxyl group may be contained in the form of acid (—$SO_3H$, —COOH), or may be contained as ions (—$SO_3^-$, —$COO^-$).

In addition, "salt" indicates at least one type of alkali metal salts, alkaline earth metal salts, ammonium salts and saturated ammonium salts.

Alkali metal salts and substituted ammonium salts may be the same as those described above.

Examples of alkaline earth metal salts are magnesium salts and calcium salts.

Examples of saturated ammonium salts are aliphatic ammonium salts, saturated alicyclic ammonium salts and unsaturated alicyclic ammonium salts.

As a monomer unit represented by general formula (1) above, it is preferred from the viewpoint of processability that any one of $R^1$ to $R^4$ be a straight-chain or branched-chain alkoxyl group having 1 to 4 carbon atoms, any of the rest be a sulfonic acid group and the rest be hydrogen.

The conductive polymer (A) is preferred to contain a monomer unit represented by general formula (1) above at 10 to 100 mol %, more preferably 50 to 100 mol %, based on 100 mol % of all monomer units composed of the conductive polymer (A). It is especially preferable to be 100 mol %, because excellent dissolubility in water and organic solvents is achieved regardless of its pH.

Also, the conductive polymer (A) is preferred to contain a monomer unit represented by general formula (1) at 10 or more in the molecule, namely, at 10 mol % or more, because excellent conductivity is achieved at such content.

The conductive polymer (A) in the first embodiment of the present invention (hereinafter may also be referred to as a water-soluble aniline-based conductive polymer) is preferred to be contained at 70% or more, more preferably at 80% or more, especially preferably at 90% or more, considering the content of the acidic group relative to the total number of a monomer unit represented by general formula (1), namely, the total number of aromatic rings, as well as from the viewpoint of enhancing solubility.

In another aspect of the first embodiment of the present invention, the content of a sulfonic acid group or a carboxyl group relative to the total number of aromatic rings in the conductive polymer (A) is preferred to be 50% or more, more preferably 70% or more, especially preferably 90% or more, and most preferably 100%. A content of 50% or more in the conductive polymer (A) is preferable since the dissolubility improves significantly.

The above content can be calculated from the ratio of monomers supplied when the conductive polymer is produced.

Also, in the conductive polymer (A), the acidic group other than a sulfonic acid group or a carboxyl group on the aromatic ring of a monomer unit is preferred to be an electron-donating group from the viewpoint of reactivity of the monomer. In particular, it is preferred to be an alkyl group having 1 to 24 carbon atoms, an alkoxyl group having 1 to 24 carbon atoms, a halogen group (—F, —Cl, —Br or I), or the like. Among those, an alkoxyl group having 1 to 24 carbon atoms is more preferred from the viewpoint of electron-donating properties.

In addition, as long as solubility, conductivity and other properties are not affected, monomer units of the conductive polymer (A) except for the unit represented by the general formula (1) may include at least one type of a monomer unit selected from the group consisting of substituted or unsubstituted anilines, thiophenes, pyrroles, phenylenes, vinylenes, and other divalent unsaturated or divalent saturated groups. Examples of substituted groups are acidic groups, alkyl groups, alkoxyl groups and halogen groups.

Moreover, the conductive polymer (A) is preferred to be a compound with a structure represented by the following general formula (5).

[Chemical formula 13]

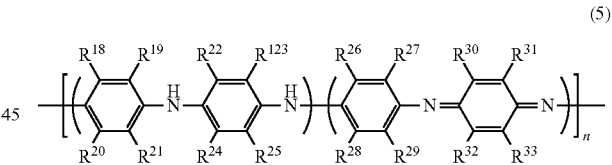

(5)

In general formula (5), $R^{18}$ to $R^{33}$ are each independently selected from the group consisting of a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group and a halogen atom. At least one of $R^{18}$ to $R^{33}$ is an acidic group. Also, "n" indicates the degree of polymerization. In the first embodiment of the present invention, "n" is preferred to be a whole number of 5 to 2500.

Among the compounds with the structure represented by the general formula (5), poly(2-sulfo-5-methoxy-1,4-iminophenylene) is especially preferred because of its excellent dissolubility.

The weight average molecular weight of the conductive polymer (A) is preferred to be 3,000 to 1,000,000, more preferably 3,000 to 50,000. If the weight average molecular weight of a conductive polymer is 3,000 or more, conductivity, film-forming performance and film strength are excellent. On the other hand, if the weight average molecular weight of a conductive polymer is 1,000,000 or less, dissolubility in solvents is excellent.

The weight average molecular weight (in terms of sodium polystyrene sulfonate) of a conductive polymer is measured by gel permeation chromatography (GPC).

In another aspect, the weight average molecular weight of the conductive polymer (A) is preferred to be 3,000 to 1,000,000, more preferably 5,000 to 80,000, especially preferably 10,000 to 70,000, from the viewpoint of conductivity.

In another aspect, at least one part of the acidic group contained in the conductive polymer (A) of the present invention is preferred to be a free acid type from the viewpoint of improving conductivity.

In another aspect of the present invention, the weight average molecular weight of a conductive polymer (A) in terms of sodium polystyrene sulfonate measured by gel permeation chromatography (hereinafter referred to as GPC) is preferred to be 2,000 to 1,000,000, more preferably 3,000 to 800,000, even more preferably 5,000 to 500,000, especially preferably 10,000 to 100,000, from the viewpoints of conductivity, dissolubility and film-forming performance.

If the weight average molecular weight of the conductive polymer (A) is less than 2,000, excellent dissolubility is obtained, but conductivity and film-forming performance may be insufficient.

On the other hand, if the weight average molecular weight is greater than 1,000,000, excellent conductivity is obtained, but dissolubility may be insufficient.

Here, "film-forming performance" indicates the composition is capable of forming uniform film that does not repel or the like, and such performance is evaluated by a spin-coating method on glass or the like. More specifically, a conductive composition is coated on glass by spin coating, and the result is evaluated visually or by using a microscope or the like.

(Method for Producing Conductive Polymer (A))

In the first embodiment of the present invention, a conductive polymer (A) described above is produced using a known method. It is not limited to any method as long as the effects of the present invention are achieved.

A specific example is, for example, a method for polymerizing a polymerizable monomer containing the monomer unit above by various synthesizing methods such as chemical oxidation and electrolytic oxidation. For example, synthesizing methods described in JP H7-196791A, JP H7-324132A and the like proposed by the inventors of the present invention may be employed.

As described above, a conductive polymer (A) is produced by a known method. More specifically, such a method includes a step for polymerizing at least one type of a compound (monomer) selected from the group consisting of anilines having acidic substituents, their alkali metal salts, ammonium salts and substituted ammonium salts using an oxidizing agent in the presence of a basic reaction auxiliary.

An example of anilines having acidic substituents is an aniline substituted by sulfonic acid which has sulfonic acid as an acidic group.

Typical anilines substituted by sulfonate are aminobenzenesulfonic acids; in particular, o-, m- and p-aminobenzensulfonic acids, aniline-2,6-disulfonic acid, aniline-2,5-disulfonic acid, aniline-3,5-disulfonic acid, aniline-2,4-disulfonic acid, aniline-3,4-disulfonic acid and the like are preferred.

Other than aminobenzenesulfonic acids, anilines substituted by sulfonate are, for example, alkyl-group-substituted aminobenzenesulfonic acids such as methylaminobenzenesulfonic acid, ethylaminobenzenesulfonic acid, n-propyl aminobenzenesulfonic acid, isopropyl-aminobenzenesulfonic acid, n-butylaminobenzenesulfonic acid, sec-butylaminobenzenesulfonic acid, and t-butylaminobenzenesulfonic acid; aminobenzenesulfonic acids substituted by alkoxyl group such as methoxyaminobenzenesulfonic acid, ethoxyaminobenzenesulfonic acid, and propoxyaminobenzenesulfonic acid; aminobenzenesulfonic acids substituted by hydroxyl group; aminobenzenesulfonic acids substituted by nitro group; and aminobenzenesulfonic acids substituted by halogen such as fluoroaminobenzenesulfonic acid, chloroaminobenzenesulfonic acid, and bromoaminobenzenesulfonic acid.

Among those, because a conductive polymer (A) with especially excellent conductivity and dissolubility is obtained, aminobenzenesulfonic acids substituted by alkyl-group, aminobenzenesulfonic acids substituted by alkoxyl group, aminobenzenesulfonic acids substituted by hydroxyl group, or aminobenzenesulfonic acids substituted by halogen are preferred. Also, aminobenzenesulfonic acids substituted by alkoxyl group, their alkali metal salts, ammonium salts and substituted ammonium salts are especially preferred from the viewpoint of processability.

Those anilines substituted by sulfonic acid may be used alone or in combination of two or more in any proportion.

Examples of a basic reaction auxiliary used for producing a conductive polymer (A) are inorganic bases, ammonia, aliphatic amines, cyclic saturated amines, cyclic unsaturated amines and the like.

Examples of basic reaction auxiliaries are preferred to be inorganic bases, more specifically, sodium hydroxides, potassium hydroxides, lithium hydroxides and the like.

Examples of basic reaction auxiliaries other than inorganic bases are aliphatic amines such as methylamine, dimethylamine, trimethylamine, ethylamine, diethylamine, triethylamine, ethylmethylamine, ethyldimethylamine, diethylmethylamine and the like; and cyclic unsaturated amines such as pyridine, α-picoline, β-picoline, γ-picoline and the like.

Those basic reaction auxiliaries may be used alone or in combination of two or more in any proportion.

As for the content of such a basic reaction auxiliary to be added, it is preferred to be 0.01 to 100 times at the weight ratio, relative to the weight of the monomer, and is more preferred to be 0.1 to 10 times.

An oxidizing agent used for producing a conductive polymer (A) is not limited specifically as long as its standard electrode potential is 0.6 V or more. For example, peroxodisulfuric acids such as ammonium peroxodisulfate, sodium peroxodipersulfate, potassium peroxodisulfate and hydrogen peroxide are preferred to be used.

Those oxidizing agents may be used alone or in combination of two or more in any proportion.

The content of an oxidizing agent to be added is preferred to be 1 mol to 5 mol, more preferably 1 mol to 3 mol, based on 1 mol of the monomer above.

Examples of methods for polymerizing a conductive polymer (A) are: dropping a mixed solution of a monomer and a basic reaction auxiliary into an oxidizing agent solution; dropping an oxidizing agent solution into a mixed solution of a monomer and a basic reaction auxiliary; and dropping an oxidizing agent solution and a mixed solution of a monomer and a basic reaction auxiliary into a reaction vessel or the like at the same time.

After the polymerization process, the solvent is filtrated by a filtration instrument such as a centrifugal separator.

Moreover, the polymer filtrate is cleansed, if needed, by alcohols such as methyl alcohol and ethyl alcohol, acetone, acetonitrile or the like, and dried to obtain a polymer (conductive polymer (A)).

(Conductive Composition)

In a conductor according to the first embodiment of the present invention, the conductive composition that forms a conductive coating film is preferred to be any of the conductive compositions according to the later-described second through sixth embodiments of the present invention.

Method for Producing Conductor of the First Embodiment

A conductor according to the first embodiment of the present invention is produced when a conductive coating film is formed on at least one surface of a substrate by coating a conductive composition containing a conductive polymer (A) and by drying the composition, and then the film is kept at normal temperature (25° C.) for 1 to 60 minutes or heat treatment is performed on the film.

In the case of performing the heat treatment, the temperature for the heat treatment is preferred to be in a range of 40° C. to 250° C., more preferably in a range of 60° C. to 200° C., from the viewpoint of conductivity. The treatment time is preferred to be within one hour, more preferably within 30 minutes, from the viewpoint of stability.

Methods for applying the conductive composition on a substrate are not limited specifically as long as the effects of the present invention are achieved; for example, spin coating, spray coating, dip coating, roll coating, gravure coating, reverse coating, roll brushing, air knife coating, curtain coating methods and the like are used.

The film thickness of the conductive coating film obtained by applying the conductive composition is preferred to be 1 to 100 nm, more preferably 3 to 70 nm, especially preferably 5 to 40 nm. The film thickness can be measured using a stylus profiler (instrument for measuring profile, surface roughness, and microscopic shapes).

As for a substrate, it is not limited specifically as long as the effects of the present invention are achieved. Examples of a substrate are polyester resins such as PET and PBT, polyolefin resins represented by polyethylene and polypropylene, vinyl chloride, nylon, polystyrene, polycarbonate, epoxy resin, fluororesin, polysulfone, polyimide, polyurethane, phenolic resin, silicone resin, molded products of various polymer compounds such as synthetic paper, film, paper, iron, glass, fused quartz, various wafers, aluminum, copper, zinc, nickel and stainless steel; and products on which various coating materials, photosensitive resin, resist or the like are coated on the materials listed above.

The thickness of a substrate is not limited specifically as long as the effects of the present invention are achieved; however, the thickness is preferred to be 1 μm to 2 cm, more preferably 10 μm to 1 cm.

A step for applying a conductive composition to the substrate above may be employed before or during the process for manufacturing the substrate, for example, uniaxial stretching, biaxial stretching, molding or embossing. Alternatively, a step for applying the composition to the substrate may be employed after those processing steps are completed.

Also, a conductive coating film may be formed by applying the conductive composition on top of substrates listed above, on which one of various coating materials or photosensitive materials is already coated.

Second Embodiment: Conductive Composition

Next, a conductive composition according to the second embodiment of the present invention is described.

The conductive composition of the second embodiment contains a conductive polymer (A) and a surfactant (B), and is characterized by the following: the surfactant (B) contains a water-soluble polymer (C) having a nitrogen-containing functional group and a terminal hydrophobic group; and the content of a compound (D1) with an octanol/water partition coefficient (Log Pow) of 4 or more in the conductive composition is 0.001 mass % or less, relative to the total mass of the conductive composition.

In addition, a conductive polymer (A) is preferred to have a monomer unit represented by the following general formula (1).

[Chemical formula 14]

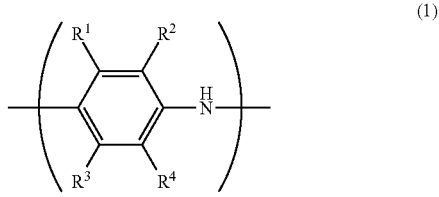

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

In addition, the conductive polymer (A) is preferred to have at least one acidic group selected from the group consisting of sulfonic acid groups and carboxyl groups.

Furthermore, the second embodiment of the present invention has the following aspects.

An aspect of the second embodiment is a surfactant composition, which contains, as a surfactant, a water-soluble polymer having a nitrogen-containing functional group and a terminal hydrophobic group and may optionally contain a compound (D1) with an octanol/water partition coefficient (Log Pow) of 4 or more. Here, the content of a compound (D1) with an octanol/water partition coefficient (Log Pow) of 4 or more is 1 part by mass or less based on 100 parts by mass of the water-soluble polymer.

Another aspect of the second embodiment is a method for producing the surfactant composition: in the method, an adsorbent makes contact with a mixture containing a water-soluble polymer having a nitrogen-containing functional group and a terminal hydrophobic group and a compound (D1) with an octanol/water partition coefficient (Log Pow) of 4 or more so as to decrease the compound (D1) with an octanol/water partition coefficient (Log Pow) of 4 or more.

Another aspect of the second embodiment is a conductive composition containing the surfactant composition above and a water-soluble conductive polymer. Another aspect of the second embodiment is a method for forming a conductive coating film by applying the conductive composition on a substrate after the composition is filtrated through a filter.

In another aspect of the second embodiment of the present invention, the surfactant composition contains a water-soluble polymer (hereinafter referred to as a "surfactant") having a nitrogen-containing functional group and a terminal hydrophobic group, and may optionally contain a compound (D1) with an octanol/water partition coefficient (Log Pow) of 4 or more. The content of a compound (D1) with an octanol/water partition coefficient (Log Pow) of 4 or more is 1 part by mass or less based on 100 parts by mass of the surfactant.

(Compound (D1))

In the second embodiment of the present invention, Log Pow indicates the ratio of concentrations of the compound in octanol and in water respectively when a subject compound is dissolved in a mixture of octanol and water (at any given mixing ratio). In the present specification, Log Pow is a value calculated by using Chem Draw Pro 12.0 made by Cambridge Soft In addition, the content of a compound (D1) with an octanol/water partition coefficient (Log Pow) of 4 or more is measured by an internal standard method using gas chromatography and is indicated by the value in terms of n-dodecyl mercaptan. Namely, a sample was measured by a gas chromatograph under the following conditions. The column was retained at a temperature of 40° C. for 1 minute. Next, the temperature was raised from 40° C. to 60° C. (time for raising the temperature was 5 minutes). After the column temperature was held at 60° C. for 1 minute, the temperature was further raised from 60° C. to 230° C. (time for raising the temperature was 30 minutes) and the column was held at 230° C. for 10 minutes. The flow rate of the carrier was 4.1 mL/min. The content was obtained from a peak, when the retention time was 36 minutes.

In the second embodiment of the present invention, the content of a compound (D1) with an octanol/water partition coefficient (Log Pow) of 4 or more in a conductive composition is 0.001 mass % or less relative to the total mass of the conductive composition. In addition, the content of a compound (D1) in a surfactant (B) is 1 part by mass or less based on 100 parts by mass of the surfactant (B), that is, the content of a compound (D1) in the surfactant (B) is 1 mass % or less relative to the total mass of the surfactant (B). Namely, by setting the content of a compound (D1) to be n 0.001 mass % or less relative to the total mass of the conductive composition, or by setting the content of a compound (D1) to be 1 mass % or less relative to the total mass of the surfactant (B), the filtration performance of the conductive composition during microfiltration is enhanced. In addition, the content of a compound (D1) in the conductive composition is preferred to be set at 0 to 0.001 mass %, especially preferable at 0 mass %, relative to the total mass of the conductive composition. Also, the content of a compound (D1) to the total mass of the surfactant (B) is more preferred to be set at 0.05 mass % or less, especially preferable at 0 mass %, of the total mass of the conductive composition. A compound (D1) indicates such a compound with an octanol/water partition coefficient (Log Pow) of 4 to 10.

In the second embodiment of the present invention, a compound (D1) with an octanol/water partition coefficient (Log Pow) of 4 or more is not limited specifically, as long as the compound has a Log Pow of 4 or more. Examples of a compound (D1) includes chain transfer agents, polymerization initiators used for producing a later-described water-soluble polymer (C), or byproducts of such agents.

For example, during the process for producing a water-soluble polymer (C), when 2,2'-azobis(2-methylbutyronitrile) as a polymerization initiator and n-dodecyl mercaptan as a chain transfer agent are used, their reaction product, 2-(dodecylthio)-2-methylbutyronitrile (Log Pow of 6.5), is included as a compound (D1). Also, when 2,2'-azobis isobutyronitrile as a polymerization initiator and n-octyl mercaptan as a chain transfer agent are used, their reaction product, 2-(octylthio)-2-methylpropanenitrile (Log Pow of 4.4), is included as a compound (D1).

(Surfactant (B))

In the second embodiment of the present invention, a surfactant (B) contains a water-soluble polymer (C) having a nitrogen-containing functional group and a terminal hydrophobic group. Such a water-soluble polymer (C) is produced by introducing a hydrophobic group at a terminal of a water-soluble polymer having a nitrogen-containing functional group, for example.

In particular, "a terminal of a water-soluble polymer" indicates a site between a main-chain end to the polymer end. Namely, a water-soluble polymer (C) indicates such a polymer that has a monomer unit having a nitrogen-containing functional group as a main-chain structure while having a hydrophobic group at a site between the main-chain end and the polymer end. "Main-chain structure" indicates a monomer unit having a nitrogen-containing functional group except for monomer units derived from the terminal hydrophobic group.

(Water-Soluble Polymer (C))

A surfactant (B) containing such a water-soluble polymer (C) exhibits surface activity by the hydrophilic group (site of main-chain structure) and by the terminal hydrophobic group of the water-soluble polymer (C). Examples of a terminal hydrophobic group are those containing at least one type selected from the group consisting of alkyl groups, aralkyl groups and aryl groups having 3 to 100 carbon atoms, more preferably 5 to 50 carbon atoms, especially preferably 7 to 30 carbon atoms. Specific examples of a terminal hydrophobic group are alkyl groups, aralkyl groups, aryl groups, alkoxyl groups, aralkyloxy groups, aryloxy groups, alkylthio groups, aralkylthio groups and arylthio groups each having 3 to 100 carbon atoms, primary or secondary alkylamino groups, aralkylamino groups and arylamino groups. Alkylthio groups, aralkylthio groups and arylthio groups each having 5 to 50 carbon atoms are preferred. Specific examples are n-octyl mercaptan, n-dodecyl mercaptan and the like.

In the second embodiment of the present invention, the content of a water-soluble polymer (C) in the surfactant (B) is preferred to be 99 to 100 mass %, more preferably 99.9 to 100 mass %, relative to the total mass of the surfactant (B). Also, in the second embodiment, it is most preferred if the surfactant (B) is composed only of a water-soluble polymer (C).

The terminal hydrophobic group of a water-soluble polymer (C) may be introduced to the water-soluble polymer (C) by any method as long as the effects of the present invention are achieved. Usually, selecting a chain transfer agent used for a vinyl polymerization is preferred because of its easy process.

An example of a chain transfer agent is a compound capable of introducing a group such as the above-listed alkyl groups, aralkyl groups and aryl groups into the end of a water-soluble polymer (C). Such a compound is preferred to contain at least one type of a hydrophobic group selected from the group consisting of alkyl groups, aralkyl groups and aryl groups each having 3 to 100 carbon atoms, preferably 5 to 50, especially preferably 7 to 30 carbon atoms. Examples of preferred chain transfer agents are thiols, disulfides, thioethers and the like having a hydrophobic group such as alkylthio groups, aralkylthio groups and arylthio groups each having 7 to 20 carbon atoms.

The main-chain structure of a water-soluble polymer (C) includes a monomer unit having a nitrogen-containing functional group, especially a unit derived from a vinyl monomer having a nitrogen-containing functional group. It may also include other monomer units such as vinyl monomers that do not have a nitrogen-containing functional group. As for a vinyl monomer having a nitrogen-containing functional group, acrylamides and their derivatives and heterocyclic monomers having a nitrogen-containing functional group are preferred. Especially, those having an amide group are preferred.

Specific examples of vinyl monomers having a nitrogen-containing functional group are vinyl monomers having an amide group such as acrylamide, N,N-dimethylacrylamide, N-isopropylacrylamide, N,N-diethylacrylamide, N,N-dimethylaminopropylacrylamide, t-butylacrylamide, diacetonacrylamide, N,N'-methylenebis acrylamide, N-vinyl-N-methylacrylamide, n-vinyl-2-pyrrolidone, and N-vinylcaprolactam. Among those, acrylamides, N-vinylpyrrolidone, and N-vinylcaprolactam are especially preferred.

When the main-chain site of a water-soluble polymer (C) contains a vinyl monomer unit having a nitrogen-containing functional group, the number of repeated carbon atoms, namely, its degree of polymerization, is preferred to be 2 to 1000.

Namely, in the second embodiment of the present invention, a water-soluble polymer (C) is preferred to be a polymer compound having at least one terminal hydrophobic group selected from the group consisting of alkylthio groups, aralkylthio groups and arylthio groups as well as having at least one nitrogen-containing functional group selected from the group consisting of a pyrrolidone skeleton, caprolactam skeleton, and amide skeleton.

In another aspect of the second embodiment of the present invention, a water-soluble polymer (C) is preferred to be a polymer compound obtained by polymerizing at least one chain transfer agent selected from the group consisting of n-dodecyl mercaptan and n-octyl mercaptan and at least one vinyl monomer selected from the group consisting of N-vinylpyrrolidone, N-vinylcaprolactam, and acrylamides.

(Method for Producing Water-Soluble Polymer (C))

A water-soluble polymer (C) is produced, for example, by the following method: a main-chain structure is produced by polymerizing the vinyl monomer above having a nitrogen-containing functional group preferably in the presence of a polymerization initiator under conditions of 80° C. and normal pressure, and the above-described chain transfer agent is then added for subsequent reactions. Alternatively, a water-soluble polymer (C) may also be produced by polymerizing the above vinyl polymer having a nitrogen-containing functional group in the presence of both a polymerization initiator and a chain transfer agent. After polymerization, aging and cooling treatments are preferred to be conducted.

As long as the effects of the present invention are achieved, the polymerization initiator is not limited to any specific type and it may be, for example, radical polymerization initiators such as 2,2'-azobis(2-methylbutyronitrile), 2,2'-azobis isobutyronitrile, 2,2'-azobis (2,4-dimethylvaleronitrile) and 1,1-azobis(cyclohexane carbonitrile).

As long as the effects of the present invention are achieved, the chain transfer agent is not limited to any specific type and it may be, for example, a mercaptan based chain transfer agent such as n-octyl mercaptan and n-dodecyl mercaptan.

More specifically, the method for producing a water-soluble polymer (C) is preferred to include a step for dropping into a solvent a mixture of the above vinyl monomer having a nitrogen-containing functional group, a chain transfer agent, and a polymerization initiator, which were described above, and a solvent.

The weight ratio of mixing a vinyl monomer having a nitrogen-containing functional group and a chain transfer agent is preferred to be 100:0.01 to 100:10, more preferably 100:0.1 to 100:5.

In addition, the temperature for dropping polymerization is preferred to be 60 to 95° C., more preferably 70 to 85° C.

Also, after the completion of dropping polymerization, it is preferred to further conduct an aging step at 70 to 95° C. for 2 to 8 hours.

The weight average molecular weight of a water-soluble polymer (C) is preferred to be 500 to 5000. Excellent surface activity is likely to be exhibited by setting the weight average molecular weight of a water-soluble polymer (C) in such a range. Such a weight average molecular weight is the value measured by using GPC (gel permeation chromatography) in water solvent and in terms of polyethylene glycol. The weight average molecular weight is more preferred to be 500 to 3000, and is especially preferred to be 500 to 1500 from the viewpoint of coating performance of the conductive composition in the second embodiment of the present invention.

In addition, after the completion of polymerization, the solvent in the surfactant (B) containing a water-soluble polymer (C) is preferred to be removed by further conducting vacuum concentration or the like. The surfactant (B) containing a water-soluble polymer (C) may contain a compound (D1) having a Log Pow of 4 or more generated by reactions of a polymerization initiator and a chain transfer agent as described above.

In a method for producing a surfactant (B) of the present embodiment, a surfactant (B) containing a water-soluble polymer (C) is preferred to make contact with an adsorbent so that a compound (D1) with an octanol/water partition coefficient (Log Pow) of 4 or more is adsorbed and removed. An adsorbent is not limited specifically as long as the effects of the present invention are achieved; for example, hydrophobic substances such as octadecyl-modified silica and activated carbon are used. Especially, activated carbon is preferred, since a compound (D1) with an octanol/water partition coefficient (Log Pow) of 4 or more in the surfactant (B) is selectively removed.

For adsorbing and removing the compound, a surfactant (B) containing a water-soluble polymer (C) is preferred to be dissolved in a solvent and then to make contact with an adsorbent.

The solvent is not limited specifically as long as the effects of the present invention are achieved; for example, water, organic solvents or the like may be used. Especially, a mixed solvent of water and an organic solvent is preferred, since the rate of removing a hydrophobic compound, namely, a compound (D1), improves.

The ratio of mixing water and an organic solvent is preferred to be 60/40 to 90/10. Examples of an organic solvent are alcohol solvents such as isopropyl alcohol. In addition, the duration in which a surfactant (B) and an adsorbent are in contact is preferred to be 1 second or more.

Another method for producing a surfactant (B) of the present embodiment is as follows: a mixture containing a water-soluble polymer (C) and a compound (D1) with an octanol/water partition coefficient (Log Pow) of 4 or more is prepared by using a vinyl monomer having a nitrogen-containing functional group, a chain transfer agent for introducing a terminal hydrophobic group and a polymerization initiator; and the mixture makes contact with the aforementioned adsorbent to adsorb and remove the compound (D1) with an octanol/water partition coefficient (Log Pow) of 4 or more.

In a conductive composition according to the second embodiment of the present invention, the content of a compound (D1) with an octanol/water partition coefficient (Log Pow) of 4 or more is 0.001 mass % or less, relative to the total mass of the conductive composition. In addition, since the content of a compound (D1) in the surfactant (B) is 1 part by mass or less based on 100 parts by mass of the surfactant (B), namely, 1 mass % or less, relative to the total mass of the surfactant (B), clogging of the filter is reduced when filtrating the conductive composition of the second embodiment. Accordingly, the surfactant (B) is suitable as an additive for a conductive composition from which contaminants need to be removed by filtration.

Method for Producing Conductive Composition of the Second Embodiment

A conductive composition according to the second embodiment of the present invention is produced by mixing a surfactant (B) and a conductive polymer (A) described above. A conductive composition of the second embodiment is preferred to be a solution that further contains water as a solvent. In addition to water, the conductive composition solution may contain another solvent such as an organic solvent.

In addition, the content of a surfactant (B) in the conductive composition of the second embodiment is preferred to be 0.01 to 20 mass %, more preferably 0.01 to 15 mass %, relative to the total mass of the conductive composition. Also, the content of a conductive polymer (A) in the conductive composition of the second embodiment is preferred to be 0.01 to 50 mass %, more preferably 0.01 to 2 mass %, relative to the total mass of the conductive composition. Furthermore, a conductive coating film is formed by applying the conductive composition of the second embodiment on a substrate after the composition is filtrated through a filter.

(Conductive Polymer (A) in the Second Embodiment of the Present Invention)

As a conductive polymer (A) in the conductive composition of the second embodiment of the present invention, the conductive polymer (A) described in the first embodiment above can be used. Preferred examples are also the same.

(Polymer Compound (Y))

In addition, regarding a conductive composition of the second embodiment, the strength and roughness of a conductive coating film are enhanced or adjusted by mixing a polymer compound (Y) in the conductive composition. More specifically, polyvinyl alcohol derivatives such as polyvinyl formal and polyvinyl butyral; polyacrylamides such as polyacrylamide, poly(N-t-butyl acrylamide) and polyacrylamidemethylpropane sulfonic acid; polyvinyl pyrrolidones, polyacrylic acids, water-soluble alkyd resins, water-soluble melamine resins, water-soluble urea resins, water-soluble phenolic resins, water-soluble epoxy resins, water-soluble polybutadiene resins, water-soluble acrylic resins, water-soluble urethane resins, water-soluble acrylic styrene copolymer resins, water-soluble vinyl acetate-acrylic copolymer resins, water-soluble polyester resins, water-soluble styrene-maleic acid copolymer resins, water-soluble fluorocarbon resins, and their copolymers. When a polymer compound (Y) is included, its content is preferred to be 0.01 to 20 mass %, more preferably 0.01 to 15 mass %, relative to the total mass of the conductive composition.

Moreover, the conductive composition of the second embodiment may further contain various additives such as pigments, defoamers, UV absorbers, antioxidants, heat resistance enhancers, leveling agents, anti-sag agents, matting agents, preservatives and the like, as needed.

A method for forming a conductive coating film using the conductive composition of the second embodiment is preferred to be conducted by applying the conductive composition of the second embodiment on a substrate after the composition is filtrated through a filter. The conductive composition of the second embodiment is easily filtrated through a filter when the filter made of hydrophobic materials such as polyethylene. In addition, it is preferred to apply the conductive composition of the second embodiment on at least one surface of a substrate. The application method is not limited specifically as long as the effects of the present invention are achieved; for example, spin coating, spray coating, dip coating, roll coating, gravure coating, reverse coating, roll brushing, air knife coating, curtain coating methods and the like.

Also, examples of the substrate are the same as those described in the first embodiment above. Examples of the steps for applying the conductive composition on a substrate are the same as the steps described in the first embodiment above.

To form a conductive coating film, the conductive composition of the second embodiment is applied on a substrate after the composition is filtrated through a filter, and then the substrate is kept at room temperature or heat is applied on the substrate. The heating temperature is preferred to be in a range of 40° C. to 250° C. to obtain a conductive coating film with excellent conductivity.

Another aspect of the conductive composition according to the second embodiment of the present invention is as follows: a conductive composition containing a conductive polymer (A), a surfactant (B) and water; the surfactant (B) is a water-soluble polymer (C) having a nitrogen-containing functional group and a terminal hydrophobic group, the water-soluble polymer (C) is a polymer compound obtained by polymerizing a mercaptan-based chain transfer agent and a vinyl monomer having an amide group, the content of a compound (D1) with an octanol/water partition coefficient (Log Pow) of 4 or more in the conductive composition is 0.001 mass % or less, relative to the total mass of the conductive composition; the content of a conductive polymer (A) is 0.01 to 50 mass %, the content of the surfactant (B) is 0.01 to 20 mass % and the content of water is 50 to 99.5 mass % based on the total mass of the conductive composition, and the total content of each component does not exceed 100 mass %.

In addition, another aspect of the conductive composition according to a second embodiment of the present invention is as follows: a conductive composition containing a conductive polymer (A), a surfactant (B) and water, the surfactant (B) is a water-soluble polymer (C) having a nitrogen-containing functional group and a terminal hydrophobic group, the water-soluble polymer (C) is a polymer compound obtained by polymerizing a mercaptan-based chain transfer agent and a vinyl monomer having an amide group, the content of a compound (D1) with an octanol/water partition coefficient (Log Pow) of 4 or more in the conductive composition is 0.001 mass % or less, relative to the total mass of the conductive composition, the compound (D1) is a reactant obtained by a polymerization initiator and a chain transfer agent used for producing the water-soluble polymer (C), the content of a conductive polymer (A) is 0.01 to 50 mass %, the content of the surfactant (B) is 0.01 to 20 mass % and the content of water is 50 to 99.5 mass %, based on the total mass of the conductive composition, and the total content of each component does not exceed 100 mass %.

Third Embodiment: Conductive Composition

A conductive composition according to the third embodiment of the present invention is characterized in that a water-soluble polymer (C) in a surfactant (B) contained in the conductive composition according to the second embodiment described above is a water-soluble polymer (C1) having a nitrogen-containing functional group and a terminal hydrophobic group and with the weight average molecular weight of 2000 or more.

In addition, a conductive polymer (A) is preferred to have a monomer unit represented by the following general formula (1).

[Chemical formula 15]

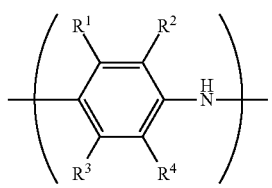

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

Also, the conductive polymer (A) is preferred to be a conductive polymer that has at least one acidic group selected from the group consisting of sulfonic acid groups and carboxyl groups.

The third embodiment of the present invention has the following aspects:
[1] a conductive composition containing a conductive polymer (A) which has at least one acidic group selected from the group consisting of sulfonic acid groups and carboxyl groups and a water-soluble polymer (C1) which has a nitrogen-containing functional group and a hydrophobic group and with the weight average molecular weight of 2000 or more;
[2] the conductive composition described in [1], wherein the nitrogen-containing functional group is an amide group;
[3] the conductive composition described in [1] or [2], wherein the terminal hydrophobic group contains at least one hydrophobic group selected from the group consisting of alkyl chains having 5 to 100 carbon atoms, aralkyl chains having 5 to 100 carbon atoms and aryl chains having 5 to 100 carbon atoms;
[4] the conductive composition described in [1] or [2], wherein the terminal hydrophobic group contains at least one hydrophobic group selected from the group consisting of alkylthio groups having 5 to 100 carbon atoms, aralkylthio groups having 5 to 100 carbon atoms and arylthio groups having 5 to 100 carbon atoms;
[5] The conductive composition described in any one of [1] to [4], wherein the conductive polymer (A) contains a monomer unit represented by the following general formula (1);

[Chemical formula 16]

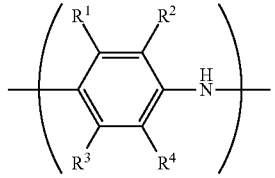

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom (—F, —Cl, —Br, or I). In addition, at least one of $R^1$ to $R^4$ is an acidic group or salt thereof. Also, an acidic group represents a sulfonic acid group or a carboxyl group.)
[6] a conductor including a substrate and a coating film formed by applying the conductive composition described in any one of [1] to [5] on at least one surface of the substrate; and
[7] A laminate including a substrate, a resist layer formed on at least one surface of the substrate, and a coating film formed by applying the conductive composition described in any one of [1] to [5] on the resist layer.

(Conductive Polymer (A) in the Third Embodiment of the Present Invention)

As a conductive polymer (A) in the conductive composition according to the third embodiment of the present invention, the conductive polymer (A) described in the first embodiment above is used. Preferred examples are also the same.

(Water-Soluble Polymer (C1))

In a conductive composition according to the third embodiment of the present invention, a water-soluble polymer (C1) indicates a water-soluble polymer having a nitrogen-containing functional group and a hydrophobic group and with a weight average molecular weight of 2000 or more.

In the conductive composition of the third embodiment, a water-soluble polymer (C1) works as a surfactant.

When a water-soluble polymer (C1) having a weight average molecular weight at a certain weight or more is used as a surfactant (B) to be combined with the conductive polymer (A), a conductive coating film is formed to exhibit excellent coating performance with smaller surface roughness, where a laminate such as resist coated on the substrate is less likely to be affected negatively.

Namely, the conductive composition according to the third embodiment is characterized by containing the conductive polymer (A) described in the first and second embodiments above and the water-soluble polymer (C1).

In addition, the nitrogen-containing functional group of the water-soluble polymer (C1) is preferred to be an amide group from the viewpoint of dissolubility.

A terminal hydrophobic group is not limited specifically as long as it contains an alkyl chain, aralkyl chain or aryl chain and the effects of the present invention are achieved.

Examples of a terminal hydrophobic group are, for example, alkyl groups, aralkyl groups, aryl groups, alkoxyl groups, aralkyloxy groups, aryloxy groups, alkylthio groups, aralkylthio groups, arylthio groups, primary or secondary alkylamino, aralkylamino and arylamino groups.

Here, a terminal hydrophobic group indicates a hydrophobic group introduced to a "water-soluble polymer end" as described in the second embodiment above.

In the conductive composition according to the third embodiment of the present invention, the terminal hydrophobic group in a water-soluble polymer (C1) is preferred to have at least one group selected from the group consisting of alkyl chains having 5 to 100 carbon atoms, aralkyl chains having 7 to 100 carbon atoms and aryl chains having 6 to 100 carbon atoms from the viewpoints of dissolubility and surface activity.

Furthermore, the terminal hydrophobic group is more preferred to have at least one group selected from the group consisting of alkyl chains having 6 to 70 carbon atoms, aralkyl chains having 7 to 70 carbon atoms and aryl chains having 6 to 70 carbon atoms, and is especially preferred to have at least one group selected from the group consisting of alkyl chains having 7 to 30 carbon atoms, aralkyl chains having 7 to 30 carbon atoms and aryl chains having 7 to 30 carbon atoms.

In addition, from the viewpoint of surface activity, the terminal hydrophobic group is preferred to be at least a group selected from the group consisting of alkylthio groups having 5 to 100 carbon atoms, aralkylthio groups having 7 to 100 carbon atoms and arylthio groups having 6 to 100 carbon atoms.

Moreover, the terminal hydrophobic group is further preferred to be at least one group selected from the group consisting of alkylthio groups having 7 to 50 carbon atoms, aralkylthio groups having 6 to 50 carbon atoms and arylthio groups having 6 to 50 carbon atoms, and is especially preferred to be at least one group selected from the group consisting of alkylthio groups having 7 to 30 carbon atoms, aralkylthio groups having 7 to 30 carbon atoms and arylthio groups having 7 to 30 carbon atoms.

More specific examples are dodecyl groups, octyl groups and the like.

Here, the terminal hydrophobic group is preferred to have at least one group selected from the group consisting of the above alkyl chains, aralykyl chains and aryl chains. From the viewpoints of dissolubility and surface activity, it is further preferred to be an alkylthio group having an alkyl chain and a sulfur atom, an aralkylthio group having an aralkyl chain and a sulfur atom, or an arylthio group having an aryl chain and a sulfur atom.

Among those, from the viewpoints of dissolubility and surface activity, alkylthio groups are especially preferred.

The water-soluble polymer (C1) of the third embodiment has a nitrogen-containing functional group and a terminal hydrophobic group, and with weight average molecular weight is 2000 or more. The weight average molecular weight of the water-soluble polymer (C1) is preferred to be 2000 to 1,000,000, more preferably 2500 to 100,000, especially preferably 5000 to 10,000.

As long as the effects of the present invention are achieved, the main-chain structure of a water-soluble polymer (C1) is not limited specifically if it is a homopolymer of a vinyl monomer having a nitrogen-containing functional group or a copolymer of another vinyl monomer and if it is water soluble.

Here, the main-chain structure of a water-soluble polymer (C1) indicates a monomer unit having a nitrogen-containing functional group, excluding monomer units derived from the terminal hydrophobic group of the water-soluble polymer (C1), as described in the second embodiment above.

The nitrogen-containing functional group is preferred to be an amide group, and examples of a vinyl monomer having an amide group are acrylamides and their derivatives, N-vinyl lactam and the like. Specific examples are the same as those listed for the nitrogen-containing group in the second embodiment above, and preferred examples are also the same.

(Method for Producing Water-Soluble Polymer (C1))

For producing a water-soluble polymer (C1), it is not limited to any specific method for introducing a hydrophobic group to an end of a water-soluble polymer having a nitrogen-containing functional group as long as the effects of the present invention are achieved. An introduction method by selecting a chain transfer agent used for vinyl polymerization is easy and preferable.

In the above method, a chain transfer agent is not limited specifically as long it is capable of introducing the above terminal hydrophobic group and the effects of the present invention are achieved. Thiol, disulfide, thioether and the like are preferred to be used since preferred terminal hydrophobic groups such as alkylthio groups, aralkylthio groups and arylthio groups are easy to obtain. In particular, mercaptan-based chain transfer agents, styrene-based chain transfer agents and the like are listed, and n-dodecyl mercaptan and n-octyl mercaptan are preferred.

More specifically, a production method is preferred to include the step for obtaining a water-soluble polymer (C); that is, a mixture of the above vinyl monomer having the nitrogen-containing functional group, a chain transfer agent, a polymerization initiator and a solvent, is dropped into a solvent to carry out polymerization.

The weight ratio of mixing the vinyl monomer having the nitrogen-containing functional group and a chain transfer agent is preferred to be 100:0.01 to 100:10, more preferably 100:0.1 to 100:5.

In addition, the temperature for performing the dropping polymerization is preferred to be 60 to 95° C., more preferably 70 to 85° C.

Furthermore, the production method is preferred to include an aging step at 70 to 95° C. for 2 to 8 hours, after the dropping polymerization.

The number of repeated monomer units in the main-chain structure having a nitrogen-containing functional group in a water-soluble polymer (C1), namely, the degree of polymerization of the vinyl monomer having a nitrogen-containing functional group is preferred to be 10 to 100,000, more preferably 15 to 1,000 and especially preferably 20 to 200, from the viewpoint of dissolubility of the water-soluble polymer (C1).

In addition, from the viewpoint of surface activity, the ratio between the molecular weight of the main-chain structure having a nitrogen-containing functional group (hereinafter, may also be referred to as "molecular weight of the water-soluble part") and the molecular weight of the terminal hydrophobic site (hereinafter, may also be referred to as "molecular weight of the hydrophobic part"), namely, the ratio of (molecular weight of the water-soluble part)/(molecular weight of the hydrophobic part) in the water-soluble polymer (C1) is preferred to be 1 to 150, more preferably 5 to 100. Here, the "molecular weight of the water-soluble part" and the "molecular weight of the hydrophobic part" can calculate from the ratio of the weight average molecular weight of the obtained water-soluble polymer (C1) and the respectively added amounts of the monomer which constitutes the main-chain structure and the chain transfer agent which constitutes the terminal hydrophobic site.

Unlike conventional surfactants, the water-soluble polymer (C1) is capable of expressing surface activity by the main-chain structure (water-soluble part) having a nitrogen-containing functional group and by a terminal hydrophobic group (hydrophobic part).

Therefore, since the conductive composition does not contain acid or base and byproduct generated by hydrolysis, the conductive composition containing a water-soluble polymer (C1) according to the third embodiment enhances coating performance without negatively affecting a substrate or a laminate such as a resist coated on a substrate.

Moreover, by setting the weight average molecular weight of the water-soluble polymer (C1) at 2000 or more, it is able to reduce the content of components having low molecular weight.

Thus, when the conductive composition of the third embodiment is applied to form a conductor on a resist layer, it is able to suppress that the resist surface be dissolved by migrating the component having low molecular weight to the interface of the resist layer Accordingly, even if the conductor obtained by applying the conductive composition of the third embodiment that contains the water-soluble polymer (C1) to the resist surface was used under a high temperature of 100° C. or more, the film thickness of the resist is less likely to decrease. Also, surface roughness of the conductor caused by the component having low molecular weight is suppressed.

The glass transition temperature of the water-soluble polymer (C1) is preferred to be 60° C. to 250° C., more preferably 65° C. to 200° C., especially preferably 70° C. to 150° C., from the viewpoint of fluidity.

Here, "the component having low molecular weight" indicates oligomer components with a weight average molecular weight of 500 to 1300.

Moreover, in conventional surfactants such as a water-soluble polymer described in Patent Literature 1 (hereinafter, may also be referred to as "water-soluble polymer (Z)"), there are problems that effects to suppress the surface roughness of a conductive coating film derived from the skeleton of a conductive polymer are insufficient.

However, the water-soluble polymer (C1) of the present invention is capable of reducing roughness on the surface of a conductive coating film derived from the skeleton of a conductive polymer (A) by improving the weight average molecular weight of a water-soluble polymer.

Accordingly, the conductive composition of the third embodiment that contains the water-soluble polymer (C1) as a surfactant is capable of forming a conductive coating film with surface roughness applicable to a next-generation process for semiconductor devices.

Method for Producing Conductive Composition of the Third Embodiment

The conductive composition according to the third embodiment of the present invention is produced by mixing the water-soluble polymer (C1) with the conductive polymer (A) as described in the first embodiment above.

The water-soluble polymer (C1) is preferred to be used by being dispersed in a later-described solvent (X), and its content is preferred to be 0.01 to 20 parts by mass, more preferably 0.01 to 15 parts by mass based on 100 parts by mass of solvent (X).

In the conductive composition of the third embodiment, the content of the water-soluble polymer (C1) is preferred to be 0.01 to 20 mass %, more preferably 0.01 to 15 mass %, relative to the total content (100 mass %) of the conductive composition. In addition, in the conductive composition of the third embodiment, the content of the conductive polymer (A) is preferred to be 0.01 to 50 mass %, more preferably 0.01 to 2 mass %, relative to the total mass of the conductive composition.

Moreover, the ratio of the water-soluble polymer (C1) and conductive polymer (A) is preferred to be 1:9 to 9:1, more preferably 2:8 to 8:2.

(Solvent (X))

A solvent (X) used in the third embodiment of the present invention is not limited specifically as long as it can dissolve the conductive polymer (A) and the water-soluble polymer (C1) and the effects of the present invention are achieved. Water or a mixture of water and the following is preferred: alcohols such as methanol, ethanol, isopropyl alcohol, propyl alcohol and butanol; ketones such as acetone and ethylisobutylketone; ethylene glycols such as ethylene glycol and ethylene glycol methylether; propylene glycols such as propylene glycol, propylene glycol methyl ether, propylene glycol ethyl ether, propylene glycol butyl ether and propylene glycol propyl ether; amides such as dimethylformamide and dimethylacetamide; and pyrrolidone such as N-methylpyrrolidone and N-methylpyrrolidone.

When a mixture with water is used as a solvent (X), the ratio of water to organic solvent is preferred to be 1/100 to 100/1, more preferably 2/100 to 100/2.

Also, in the conductive composition of the third embodiment, a preferred amount of a solvent (X) to be used is 2 to 10,000 parts by mass, more preferably 50 to 10,000 parts by mass, based on 1 part by mass, relative to the conductive polymer (A).

The conductive composition of the third embodiment may contain the polymer compound (Y) above to enhance the strength and surface roughness of a conductive coating film, and the preferred amount of compound (Y) is the same as in the second embodiment above.

Moreover, the conductive composition of the third embodiment may further contain various additives such as pigments, defoamers, UV absorbers, antioxidants, heat resistance enhancers, leveling agents, anti-sag agents, matting agents, preservatives and the like, as needed.

(Conductor and Laminate)

A conductor obtained by the conductive composition according to the third embodiment of the present invention has a substrate and a conductive coating film formed by applying the conductive composition on at least one surface of the substrate.

Also, a laminate obtained by using the conductive composition of the third embodiment has a substrate, a resist layer formed on at least one surface of the substrate and a coating film formed by applying the conductive composition on the resist layer.

A method for applying the conductive composition on a substrate is not limited specifically as long as the effects of the present invention are achieved; for example, spin coating, spray coating, dip coating, roll coating, gravure coating, reverse coating, roll brushing, air knife coating, curtain coating methods and the like may be used.

A substrate is not limited specifically as long as the effects of the present invention are achieved; for example, polyester resins such as PET and PBT, polyolefin resins represented by polyethylene and polypropylene, vinyl chloride, nylon, polystyrene, polycarbonate, epoxy resin, fluororesin, polysulfone, polyimide, polyurethane, phenolic resin, silicone resin, finished products of various polymer compounds such as synthetic paper, film, paper, iron, glass, fused quartz, various wafers, aluminum, copper, zinc, nickel and stainless steel; and products on which various coating materials, photosensitive resin, resist or the like are coated on the materials listed above.

A step for applying a conductive composition to the substrate above may be employed before or during the process for manufacturing the substrate, for example, uniaxial stretching, biaxial stretching, molding or embossing. Alternatively, a step for applying the composition to the substrate may be employed after those processing steps are completed.

Also, since the conductive composition of the third embodiment has excellent coating properties, a conductive coating film may be formed by applying a conductive composition on top of the substrate surface where one of various coating materials or photosensitive materials is already coated.

A conductor formed by the conductive composition of the third embodiment is produced when a conductive coating film is formed on at least one surface of a substrate by coating and drying the conductive composition, and then the film is kept at normal temperature (25° C.) for 1 to 60 minutes or heat is applied to the film.

When heat is applied, the temperature is preferred to be in a range of 40° C. to 250° C., more preferably in a range of 60° C. to 200° C., from the viewpoint of conductivity. The treatment time is preferred to be one hour or less, more preferably 30 minutes or less, from the viewpoint of stability.

In addition, another aspect of the conductive composition according to the third embodiment of the present invention is as follows: the conductive composition contains a conductive polymer (A), a surfactant (B) and water, the surfactant (B) is a water-soluble polymer (C1) which has a nitrogen-containing functional group and a terminal hydrophobic group and has a weight average molecular weight of 2000 or more, the content of the conductive polymer (A) is 0.01 to 50 mass %, the content of the surfactant (B) is 0.01 to 20 mass % and the content of water is 50 to 99.5 mass % based on the total mass of the conductive composition, and the total content of each component does not exceed 100 mass %.

Fourth Embodiment: Conductive Composition

A conductive composition according to the fourth embodiment of the present invention contains a conductive polymer (A1) and a basic compound (E1), and is characterized in that the basic compound (E1) has a conjugated structure and two or more tertiary amines in the molecule.

In addition, the conductive composition is preferred to contain a surfactant (B).

Moreover, the surfactant (B) includes a water-soluble polymer (C) having a nitrogen-containing functional group and a terminal hydrophobic group. In the conductive composition, the content of a compound (D1) with an octanol/water partition coefficient (Log Pow) of 4 or more in the conductive composition is preferred to be 0.001 mass % or less, relative to the total mass of the conductive composition.

Also, the conductive polymer (A1) is preferred to have a monomer unit represented by the following general formula (1).

[Chemical formula 17]

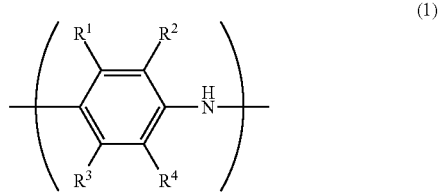

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of R1 to R4 is an acidic group or salt thereof.)

Also, the above conductive polymer (A) is preferred to be a conductive polymer that has at least one acidic group selected from the group consisting of sulfonic acid groups and carboxyl groups.

Furthermore, the conductive polymer (A1) in the conductive composition of the fourth embodiment is preferred to have a monomer unit represented by general formula (1) below.

[Chemical formula 18]

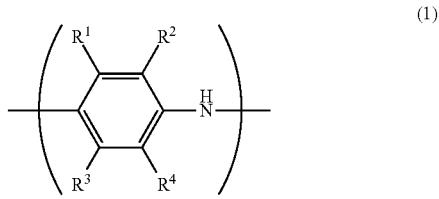

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof. Also, an acidic group represents a sulfonic acid group or a carboxyl group.)

(Conductive Polymer (A1) in the Fourth Embodiment of the Present Invention)

A conductive polymer (A1) in the conductive composition according to the fourth embodiment of the present invention is obtained by removing a basic substance from the conductive polymer (A) described above in the first embodiment.

As described above, when a conductive composition containing a conventional conductive polymer is used to form a conductive coating film on a resist layer, basic substances in the conductive coating film migrate to the resist layer, causing deactivation of acid in the exposed portion when the resist is a positive type, and thus deformation of the resist pattern or sensitivity change to a lower sensitivity range tends to occur.

On the other hand, when the resist is a negative type, narrowed patterns, reduction in film thickness, sensitivity change to a higher sensitivity range or the like tend to occur.

However, by removing the basic substances from a reaction mixture, namely, a mixture of byproducts such as residual monomers in the conductive polymer, oligomers generated in side reactions, acidic substances (sulfate ions or the like, which are decomposed products of monomers and oxidizing agent), basic substances (ammonium ions or the like, which are decomposed products of basic reaction auxiliary and oxidizing agent) and the like, migration of byproducts such as acidic substances and basic substances to the resist layer is suppressed, and adverse impact on the resist is suppressed when a conductive coating film is formed on the resist layer using the conductive composition of the fourth embodiment, especially by a pattern forming method using a chemically amplified resist and charged particle beams.

(Method for Producing Conductive Polymer (A1))

A conductive polymer (A1) is produced by a production method that includes a step for removing byproducts from the conductive polymer (A) above.

The method for removing byproducts is not limited specifically as long as the effects of the present invention are achieved. For example, various methods are available such as a column-type or batch-type process using ion exchange resins, a process using ion-exchange membranes, electrodialysis, and acid cleaning using a protonic acid solution, heating, and precipitation through neutralization.

Among those, an ion-exchange method is especially effective. Using an ion-exchange method, it is easier to effectively remove basic substances existing as reaction products of a salt and the acidic group of a conductive polymer (A1), residual monomers, and low-molecular weight acidic substances such as sulfate. Accordingly, a highly pure conductive polymer (A1) solution is obtained.

Examples of ion-exchange methods are those using cation exchange resin or anion exchange resin, electrodialysis and the like.

When a basic reaction auxiliary or the like is removed by an ion-exchange method, after a reaction mixture solution is formed by dissolving the reaction mixture in an aqueous medium to a desired solid content, namely, a solid content of 0.01 to 10 mass %, the basic reaction auxiliary and byproducts are removed.

Examples of an aqueous medium are water, water-soluble organic solvent and a mixed solvent of water and water-soluble organic solvent.

Water-soluble organic solvents are organic solvents that dissolve in water. For example, alcohols such as methanol, ethanol, 2-propanol, 1-propanol and 1-butanol; ketones such as acetone, methylethylketone, ethylisobutylketone and methylisobutylketone; ethylene glycols such as ethylene glycol, ethylene glycol methylether and ethylene glycol-mono-n-propylether; propylene glycols such as propylene glycol, propylene glycol methyl ether, propylene glycol ethyl ether, propylene glycol butyl ether and polypropylene glycol propyl ether; amides such as dimethylformamide and dimethylacetamide; pyrrolidons such as N-methylpyrrolidone and N-methylpyrrolidone; methyl lactate, ethyl lactate, β-methoxyisobutyric acid methyl ester, and hydroxyethyl esters such as α-hydroxyisobutyric acid methyl ester. Among those, alcohols and pyrrolidons are preferred from the viewpoint of dissolubility.

When an ion-exchange method using ion exchange resin is employed, the content of a sample solution, namely, the solution containing a conductive polymer (A) (hereinafter referred to as a "conductive polymer (A) solution") to the ion exchange resin, is preferred to be 10 times by volume, more preferably 5 times by volume, relative to the volume of the ion exchange resin when it is a reaction mixture solution with a solid content of 5 mass %, that is, a conductive polymer (A) solution.

As for cation exchange resin, for example, "Amberlite IR-120B" made by Organo Corporation may be used; and as for anion exchange resin, "Amberlite IRA 410" made by Organo Corporation, for example, is listed.

Namely, when byproducts are removed from the conductive polymer (A) using an ion-exchange method, it is preferred to include a step for contacting a conductive polymer (A) solution with a column containing ion exchange resin. In addition, when the conductive polymer (A) solution passes the column, the flow rate is preferred to be 10 to 1000 mL/min, more preferably 20 to 500 mL/min. Also, the temperature when the solution makes contact with ion exchange resin is preferred to be 15 to 30° C.

When electrodialysis is used, the ion-exchange membrane for electrodialysis is not limited specifically as long as the effects of the present invention are achieved. To suppress permeation of impurities caused by diffusion, it is preferred to use a permselective ion-exchange membrane for monovalent ions, for example, an ion exchange membrane with a polystyrene structure, and a cutoff molecular weight of 300 or less and 100 or more. As for such an ion-exchange membrane, for example "Neosepta CMK (cation exchange membrane, cutoff molecular weight of 300)" and "Neosepta AMX (anion exchange membrane, cutoff molecular weight of 300)" made by Astom Corporation are preferred.

In addition, as an ion-exchange membrane used for electrodialysis, bipolar membrane, which is an ion-exchange membrane with a bonded structure of an anion exchange layer and a cation exchange layer, may also be used. As for such bipolar membrane, for example "PB-1E/CMB" made by Astom Corporation is suitable.

The current density in electrodialysis is preferred to be limiting current density or less. The applied voltage at the bipolar membrane is preferred to be 10 to 50 V, more preferably 25 to 35 V.

Namely, to remove byproducts from a conductive polymer (A) through electrodialysis, it is preferred to include a step for flowing the conductive polymer (A) solution through a permselective ion-exchange membrane for monovalent ions.

(Basic Compound (E1))

The basic compound (E1) is not limited to any specific type as long as the effects of the present invention are achieved and it is a basic compound having a conjugated structure and two or more tertiary amines in the molecule. From the viewpoint of diffusion of the base itself, a compound with a boiling point of 120° C. or more is preferred. The number of tertiary amines in the molecule of a basic compound (E1) is preferred to be 2 to 6, more preferably 2 to 3.

"Having two or more tertiary amines in the molecule" above indicates at least one tertiary amine is included in a conjugated structure, namely, a cyclic structure. Here, examples of a conjugated structure, namely, of a cyclic structure, are an aromatic ring structure having 6 to 10 carbon atoms and an alicyclic structure having 5 to 15 carbon atoms.

Specific examples of a basic compound (E1) are pyridine derivatives with a substituted tertiary amino group such as 4-dimethylaminopyridine, 4-dimethyl aminomethylpyridine and 3,4-bis(dimethylamino)pyridine; 1,5-diazabicyclo[4.3.0]-5-nonene (DBN), 1,8-diazabicyclo[5.4.0]-7-undecene (DBU), and their derivatives. Among those, from the viewpoint of water solubility, the basic compound (E1) is preferred to be 4-dimethylaminopyridine, 4-dimethylaminomethylpyridine, 1,5-diazabicyclo[4.3.0]-5-nonene (DBN) or 1,8-diazabicyclo[5.4.0]-7-undecene (DBU). Those basic compounds (E1) may be used alone or in combination of two or more in any proportion.

When the basic compound (E1) is used, it is thought to work efficiently on the acidic group of a conductive polymer (A1), and enhances the stability of the conductive polymer (A1). Here, to efficiently work on the acidic group of a conductive polymer (A1) means stable neutralization is attained because of its high boiling point and strong base properties. As a result, the acidic group of a conductive polymer (A1) in the conductive coating film is prevented from becoming unstable, and thus generation of acidic substances is reduced. Accordingly, migration of the acidic substances from the conductive coating film to the resist layer is suppressed.

Method for Producing Conductive Composition of the Fourth Embodiment

The conductive composition according to the fourth embodiment of the present invention contains a conductive polymer (A1) and a basic compound (E1).

A method for introducing a basic compound (E1) into a conductive polymer (A1) is not limited specifically as long as the effects of the present invention are achieved. A basic compound (E1) may be added to a conductive polymer (A1) solution at any selected temperature and rate. It is usually preferred to maintain a conductive polymer (A1) solution at room temperature and to add a basic compound (E1) while the mixture is being stirred.

In the present application, "room temperature" indicates 25° C.

The content of a basic compound (E1) in the conductive composition of the fourth embodiment is described in detail later, but usually, from the viewpoint of stability of the acidic group of a conductive polymer (A1) solution, its content is preferred to be 1 to 100 mol %, more preferably 50 to 80 mol %, especially preferably 60 to 80 mol %, per 1 mol % of the conductive polymer (A1) in the conductive composition (A1) solution.

If the content of a basic compound (E1) per 1 mol % of the conductive polymer (A1) is 50 mol % or more or 60 mol % or more, migration of acidic substances from the conductive coating film to the resist layer caused by heating is sufficiently suppressed when the conductive coating film is formed on the resist using the conductive composition. On the other hand, if the content of the basic compound is 80 mol % or less, properties of a conductive coating film, namely, conductivity and coating performance, are maintained.

In addition, the content of a basic compound (E1) in the conductive composition of the fourth embodiment is preferred to be 0.001 to 10 mass %, more preferably 0.01 to 5 mass %, relative to the total mass of the conductive composition. Also, the content of a conductive polymer (A1) in the conductive composition of the fourth embodiment is preferred to be 0.01 to 30 mass %, more preferably 0.05 to 10 mass %, relative to the total mass of the conductive composition.

As described above, when a conductive coating film is formed on a resist layer, if acidic substances such as sulfate derived from decomposed monomers or oxidizing agents migrate from the conductive coating film to the resist layer, narrowed patterns, reduction in film thickness, and a change in sensitivity toward a higher sensitivity range tend to occur if the resist is a positive type. On the other hand, if the resist is a negative type, deformation of patterns and a change in sensitivity toward a lower sensitivity range tend to occur.

In addition, as described above, even if byproducts are removed, the acidic group eliminated from the conductive polymer (A) due to heat during the process of forming conductive coating film tends to cause problems such as migration to the resist layer.

By contrast, according to the fourth embodiment of the present invention, since the conductive composition contains the basic compound (E1), it works effectively to monomers or sulfates and tends to easily form stable salts. In addition, the acidic group of a conductive polymer (A1) is stabilized, and elimination of the acidic group when heat is applied is suppressed.

Accordingly, especially when patterns are formed using chemically amplified resist by irradiating charged particle beams, migration of acidic substances from the conductive coating film to the resist layer is suppressed, thereby lowering adverse effects on the resist layer such as reduction in film thickness.

A surfactant may further be contained in the conductive composition of the fourth embodiment of the present invention.

The surfactant is not limited specifically as long as the effects of the present invention are achieved and as long as the coating performance on the resist layer, film-forming performance and film-forming capability are enhanced. Nonionic surfactants and water-soluble polymers are usually used, and a surfactant (water-soluble polymer (Z)) having a nitrogen-containing functional group and a terminal hydrophobic group described in JP2002-226721A is preferably used.

The surfactant is more preferred to include the surfactant (B) above. By including the surfactant (B) to the conductive composition of the fourth embodiment is preferred, since filtration results of the conductive composition are enhanced.

Namely, another aspect of the conductive composition according to the fourth embodiment of the present invention is as follows:
the conductive composition contains a conductive polymer (A1), a basic compound (E1) and a surfactant (B), the surfactant (B) contains a water-soluble polymer (C) having a nitrogen-containing functional group and a terminal hydrophobic group, and the content of a compound (D1) with an octanol/water partition coefficient (Log Pow) of 4 or more in the conductive composition is preferred to be 0.001 mass % or less, relative to the total mass of the conductive composition.

In the surfactant (B) contained in the conductive composition of the fourth embodiment, the water-soluble polymer (C) may be the water-soluble polymer (C1) described above in the third embodiment of the present invention.

Namely, another aspect of the conductive composition of the fourth embodiment is as follows: the conductive composition contains a conductive polymer (A), a basic compound (E1) and a surfactant (B), and a water-soluble polymer (C) in the surfactant (B) is preferred to be a water-soluble polymer (C1) having a nitrogen-containing functional group and a terminal hydrophobic group, whose weight average molecular weight is 2000 or more.

Including a surfactant (B) containing the water-soluble polymer (C1) to the conductive composition of the fourth embodiment is preferred, since the coating performance of the conductive composition is enhanced and surface roughness of the conductor is suppressed. Moreover, including such a surfactant (B) is also preferred because migration of components having low molecular weight from the conductor to the resist surface is suppressed so as not to cause a reduction in the film thickness of the resist layer.

Also, in the fourth embodiment, if another surfactant—except for the surfactant (B)—having a nitrogen-containing functional group and a terminal hydrophobic group is contained in the conductive composition, the number of monomer units at the main-chain part having a nitrogen-containing functional group of the surfactant is preferred to be 2 to 100,000, more preferably 2 to 1000, and especially preferably 2 to 200. Here, if the number of monomer units having a nitrogen-containing functional group in the water-soluble part is too great, the surface activity tends to decrease. Regarding the molecular weight of the main chain in the water-soluble part having a nitrogen-containing functional group and the molecular weight of the terminal hydrophobic part (alkyl group, aralkyl group, aryl group site) in a surfactant, if the ratio (molecular weight of water-soluble part/molecular weight of hydrophobic part) is approximately 0.3 to 170, such a surfactant is especially preferred. Unlike conventional surfactants, such a surfactant having a nitrogen-containing functional group and a terminal hydrophobic group exhibit surface activity by the hydrophilic main-chain part having a nitrogen-containing functional group and by the terminal hydrophobic group. In addition, since such a surfactant does not contain acid or base and does not generate byproducts caused by hydrolysis, no adverse effect is exerted on the substrate or the resist coated on the substrate, and coating performance is enhanced without containing another surfactant.

The content of a surfactant contained in the conductive composition of the fourth embodiment is 0.01 to 20 parts by mass, preferably 0.01 to 15 parts by mass based on 100 parts by mass of an aqueous medium. Here, "aqueous medium" indicates water, water-soluble organic solvents, or mixed solvents of water and water-soluble organic solvents.

Namely, in the fourth embodiment of the present invention, the content of a surfactant (B) is preferred to be 0.01 to 50 mass %, more preferably 0.1 to 20 mass %, relative to the total mass of the conductive composition. In addition, when a water-soluble polymer (C) in the surfactant (B) is a water-soluble polymer (C1) above, the content of the surfactant (B) that includes a water-soluble polymer (C1) is preferred to be 0.01 to 50 mass %, more preferably 0.1 to 20 mass %, relative to the total mass of the conductive composition of the fourth embodiment.

The conductive composition according to the fourth embodiment of the present invention is coated on a surface of a substrate or the resist layer using a method generally employed for coating. Examples of a method for coating the conductive composition of the fourth embodiment are those using coaters such as gravure coater, roll coater, curtain-flow coater, spin coater, bar coater, reverse coater, kiss coater, fountain coater, rod coater, air doctor coater, knife coater, blade coater, casting coater and screen coater; a spray method of spray coating; and immersion methods such as dipping. Generally, a spin coater is used to apply a conductive composition on a resist coated on a silicon wafer or quartz mask substrate. For the purpose of improving coating properties, the conductive composition may include an alcohol, a surfactant or the like.

As described above, using the conductive composition of the fourth embodiment, a conductor is obtained where acidic substances are less likely to migrate to the resist layer when heat is applied on the conductor formed with the conductive composition.

In addition, when patterns are formed especially by a method using chemically amplified resist and irradiating charged particle beams, acidic substances are suppressed from migrating from a conductor formed by the conductive composition of the fourth embodiment to the resist layer. Thus, adverse impact on the resist layer such as a reduction in film thickness or the like is lowered.

Moreover, the conductive composition of the fourth embodiment is used for conductors applied on the resist surface in a method for forming patterns using chemically amplified resist and charged particle beams, and is also used for capacitors, transparent electrodes, semiconductors and the like.

Among the above, when the conductive composition is used for forming conductive coating film in a pattern-forming method using chemically amplified resist and charged particle beams, the conductive composition of the present invention is applied on the resist surface by a coating method, and then patterns are formed by irradiating charged particle beams. Accordingly, the adverse impact of the conductive coating film on the resist layer is suppressed and desired resist patterns are formed.

Another aspect of the conductive composition of the fourth embodiment is: the conductive composition includes a conductive polymer (A1), a basic compound (E1) that has a conjugated structure and two or more nitrogen atoms in the molecule, and water; the basic compound (E1) is at least one compound selected from the group consisting of 4-dimethylaminopyridine, 4-dimethylaminomethylpyridine, 3,4-bis(dimethylamino)pyridine, 1,5-diazabicyclo[4.3.0]-5-nonene (DBN), 1,8-diazabicyclo[5.4.0]-7-undecene (DBU), and their derivatives; based on the total mass of the conductive composition, the content of the conductive polymer (A1) is 0.01 to 30 mass %, the content of the basic compound (E1) is 0.001 to 10 mass % and the content of water is 50 to 99.5 mass %; and the total mass of each component does not exceed 100 mass %.

Another aspect of the conductive composition of the fourth embodiment is: the conductive composition includes a conductive polymer (A), a basic compound (E1) that has a conjugated structure and two or more nitrogen atoms in the molecule, a surfactant (B) and water; the basic compound (E1) is at least one compound selected from the group consisting of 4-dimethylaminopyridine, 4-dimethylaminomethylpyridine, 3,4-bis(dimethylamino)pyridine, 1,5-diazabicyclo[4.3.0]-5-nonene (DBN), 1,8-diazabicyclo[5.4.0]-7-undecene (DBU), and their derivatives; the surfactant (B) contains a water-soluble polymer (C) having a nitrogen-containing functional group and a terminal hydrophobic group; the content of a compound (D1) with an octanol/water partition coefficient (Log Pow) of 4 or more in the conductive composition is 0.001 mass % or less, relative to the total mass of the conductive composition; based on the total mass of the conductive composition, the content of the conductive polymer (A) is 0.01 to 30 mass %, the content of the basic compound (E1) is 0.001 to 10 mass %, the content of the surfactant (B) is 0.01 to 50 mass % and the content of water is 50 to 99.5 mass %; and the total mass of each component does not exceed 100 mass %.

Fifth Embodiment: Conductive Composition

A conductive composition according to the fifth embodiment of the present invention contains a conductive polymer (A) and a basic compound (E2), wherein the basic compound (E2) is a quaternary ammonium salt in which at least one of its four groups bonded to a nitrogen atom is an alkyl group having 3 or more carbon atoms.

In addition, the conductive composition is preferred to contain a surfactant (B).

Moreover, it is preferred that the surfactant (B) include a water-soluble polymer (C) having a nitrogen-containing functional group and a terminal hydrophobic group, and the content of a compound (D1) with an octanol/water partition coefficient (Log Pow) of 4 or more in the conductive composition is 0.001 mass % or less, relative to the total mass of the conductive composition.

Also, the conductive polymer (A) is preferred to have a monomer unit represented by the following general formula (1).

[Chemical formula 19]

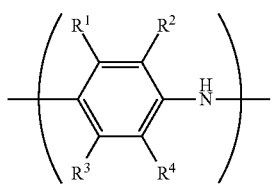

(1)

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group or salt thereof.)

Also, the above conductive polymer (A) is preferred to have at least one acidic group selected from the group consisting of sulfonic acid groups and carboxyl groups.

Moreover, another aspect of the conductive composition of the fifth embodiment is that it contains a conductive polymer (A1) and a basic compound (E2), and the basic compound (E2) is preferred to be a quaternary ammonium salt in which at least one of four groups bonded to a nitrogen atom is an alkyl group having 3 or more carbon atoms.

In addition, the fifth embodiment of the present invention has yet another aspect as follows:

[1] A conductive composition including a conductive polymer (A) having at least one acidic group selected from the group consisting of sulfonic acid groups and carboxyl groups, and a basic compound (E2) of a quaternary ammonium salt, wherein at least one of four groups bonded to a nitrogen atom in the basic compound (E2) is an alkyl group having 3 or more carbon atoms.

[2] The conductive composition described in [1] further containing a water-soluble polymer (that excludes the conductive polymer (A) above).

[3] The conductive composition described in [1] or [2], wherein the conductive polymer (A) has a monomer unit represented by the following general formula (1).

[Chemical formula 20]

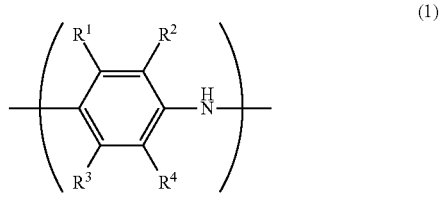

(1)

In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group. Here, an acidic group means a sulfonic acid group or a carboxyl group.

[4] A conductive coating film formed by the conductive composition described in any one of [1] to [3].

(Conductive Polymer (A) in the Fifth Embodiment)

As a conductive polymer (A) in the conductive composition of the fifth embodiment of the present invention, the conductive polymer (A) described above in the first embodiment may be used. Its preferred examples are the same.

(Basic Compound (E2))

A basic compound (E2) is a quaternary ammonium salt in which at least one of four groups bonded to a nitrogen atom is an alkyl group having 3 or more carbon atoms. From the viewpoint of improving the coating properties of the conductive composition of the fifth embodiment, at least one of the four groups bonded to a nitrogen atom is preferred to be an alkyl group having 4 or more carbon atoms. As long as the effects of the present invention are achieved, the upper-limit number of the carbon atoms in the substituent is not limited to a specific number. From the viewpoint of water solubility, 6 or less is preferred.

Examples of a basic compound (E2) are those represented by the following general formula (6).

[Chemical formula 21]

(6)

In formula (6), $R^{34}$ to $R^{37}$ represents each independently selected from the group consisting of a hydrogen atom, a straight-chain or branched-chain alkyl group having 1 to 16 carbon atoms and a straight-chain or branched-chain alkoxyl group having 1 to 16 carbon atoms. At least one of $R^{34}$ to $R^{37}$ represents an alkyl group having 3 or more carbon atoms. "A" represents selected from the group consisting of an acidic group, hydroxyl group, nitro group and halogen atom (—F, —Cl, —Br or I).

Specific examples of a basic compound (E2) are tetrabutylammonium hydroxide, tetrapropylammonium hydroxide, tetrapentylammonium hydroxide, tetrahexylammonium hydroxide and the like. Among them, tetrabutylammonium hydroxide and tetrapropylammonium hydroxide are preferred from the viewpoint of improving water solubility.

Such basic compounds (E2) may be used alone or in combination of two or more in any proportion.

From the viewpoint of further enhancing coating properties of the conductive composition according to the fifth embodiment, the content of a basic compound (E2) is preferred to be in a molar ratio of 1:0.1 to 1, more preferably 1:0.1 to 0.8, relative to 1 mol of a monomer unit having at least one acidic group selected from the group consisting of sulfonic acid groups and carboxyl groups, which is one of the monomer units of the conductive polymer (A1). The ratio is especially preferred to be 1:0.6 to 0.7, since in such content, properties of conductive coating film are kept well and the acidic group of the conductive polymer (A1) is further stabilized.

Namely, the content of a basic compound (E2) in the conductive composition of the fifth embodiment is preferred to be 0.001 to 10 mass %, more preferably 0.01 to 5 mass %, relative to the total mass of the conductive composition.

The conductive composition of the fifth embodiment may further contain a water-soluble polymer (excluding the conductive polymer (A)).

The water-soluble polymer is a component that provides the conductive composition with properties to exhibit coating performance, film-forming performance and film-forming capability on the resist layer, and works as a surfactant.

A nonionic surfactant or the like is listed for a water-soluble polymer, namely, a surfactant. Particularly preferred is a water-soluble polymer (Z) having a nitrogen-containing functional group and a terminal hydrophobic group described in JP2002-226721A.

Unlike conventional surfactants, the water-soluble polymer (Z) exhibits surface activity by a main-chain site (hydrophilic site) having a nitrogen-containing functional group and by the terminal hydrophobic site, and its effect of enhancing coating properties is high. Thus, without adding another surfactant, an excellent coating property is provided for the conductive composition. Moreover, since the water-soluble polymer (Z) does not contain acid or base, and byproducts caused by hydrolysis are less likely to be produced, adverse effects on the resist layer or the like are lowered.

As the terminal hydrophobic group, the same examples described in the surfactant (B) above are listed, and the preferred examples are the same.

The terminal hydrophobic group of a water-soluble polymer (C) may be introduced by any method as long as the effects of the present invention are achieved. Usually, selecting a chain transfer agent for vinyl polymerization is preferred because of its easy process. In such a case, a chain transfer agent is not limited specifically as long as it is capable of introducing a hydrophobic group such as below to the end of a water-soluble polymer: alkyl groups, aralkyl groups, aryl groups, alklylthio groups, aralkylthio groups and arylthio groups, each having 5 to 100 carbon atoms. For example, to obtain a water-soluble polymer having an alkylthio group, aralkylthio group or arylthio group as its terminal hydrophobic group, it is preferred to conduct vinyl polymerization using a chain transfer agent having a hydrophobic group corresponding to such a terminal hydrophobic group, for example, thiol, disulfide, thioether and the like. In particular, chain transfer agents such as n-dodecyl mercaptan and n-octyl mercaptan are preferred.

The main-chain structure (main-chain part) of a water-soluble polymer (Z) is not limited specifically as long as it is water soluble and is a homopolymer of a vinyl monomer having a nitrogen-containing functional group, or a copolymer of such a vinyl monomer and another vinyl monomer.

Examples of a vinyl monomer having a nitrogen-containing functional group are acrylamides and their derivatives as well as heterocyclic monomers having a nitrogen-containing functional group. Among them, those having an amide group are preferred. Specific examples are acrylamide, N,N-dimethylacrylamide, N-isopropylacrylami de, N,N-diethyl acrylamide, N,N-dimethylaminopropylacrylamide, t-butylacrylamide, diacetone acrylamide, N,N'-methylene bisacrylamide, N-vinyl-N-methylacrylamide, N-vinyl-2-pyrrolidone, N-vinylcaprolactam, and the like. Among them, acrylamides, N-vinyl-2-pyrrolidone and N-vinylcaprolactam are especially preferred.

For the other vinyl monomer, it is not limited specifically, as long as it is capable of copolymerizing with the vinyl polymer having a nitrogen-containing functional group. Examples are styrene, acrylic acid, vinyl acetate, long-chain α-olefins and the like.

The main-chain part of the water-soluble polymer (Z) is water soluble and has a nitrogen-containing functional group. The number of units (degree of polymerization) in the main-chain part is preferred to be 2 to 1000, more preferably 3 to 1000, especially preferably 5 to 10 in the molecule. If the number of units of the main-chain part having a nitrogen-containing functional group is too great, surface activity tends to lower.

Regarding the main-chain part of a water-soluble polymer (Z) and the terminal hydrophobic part (for example, a part of alkyl group, aralkyl group, aryl group, alkylthio group, aralkylthio group, or arylthio group), the molecular weight ratio (weight average molecular weight of main-chain part/ weight average molecular weight of terminal hydrophobic group part) is preferred to be 0.3 to 170.

In the fifth embodiment, the content of a water-soluble polymer in the conductive composition, namely, the content of a surfactant, is preferred to be 0.01 to 20 parts by mass, more preferably 0.01 to 15 parts by mass, based on 100 parts by mass of a conductive polymer (A) solution or dispersion.

If the content of a surfactant is 0.01 parts by mass or more, effects as a surfactant (for example, effects of improving coating properties) are achieved sufficiently.

On the other hand, if the content exceeds 20 parts by mass, the effects of improving coating properties reach their limit and simply result in an increase in cost.

In addition, the conductive composition of the fifth embodiment is more preferred to contain a surfactant (B) above as a surfactant. Adding a surfactant (B) to the conductive composition of the fifth embodiment is preferred since filtration results of the conductive composition are improved.

Namely, yet another aspect of the conductive composition of the fifth embodiment is preferred to be: the conductive composition includes a conductive polymer (A), a basic compound (E2) and a surfactant (B); the basic compound (E2) is a quaternary ammonium salt in which at least one of the four groups bonded to a nitrogen atom is an alkyl group having 3 or more carbon atoms; the surfactant (B) contains a water-soluble polymer (C) having a nitrogen-containing functional group and a terminal hydrophobic group; and the content of a compound (D1) with an octanol/water partition coefficient (Log/Pow) of 4 or more in the conductive composition is 0.001 mass % or less, relative to the total mass of the conductive composition.

In the fifth embodiment of the present invention, the content of the surfactant (B) in the conductive composition is preferred to be 0.01 to 50 mass %, more preferably 0.1 to 20 mass %, relative to the total mass of the conductive composition.

In the surfactant (B) contained in the conductive composition of the fifth embodiment, a water-soluble polymer (C) may be the water-soluble polymer (C1) described in the third embodiment above.

Namely, another aspect of the conductive composition of the fifth embodiment is preferred to be: the conductive composition includes a conductive polymer (A), a basic compound (E2) and a surfactant (B); the basic compound (E2) is a quaternary ammonium salt in which at least one of the four groups bonded to a nitrogen atom is an alkyl group having 3 or more carbon atoms; and a water-polymer (C) in the surfactant (B) is a water-soluble polymer (C1) having a nitrogen-containing functional group and a terminal hydrophobic group and with the weight average molecular weight of 2000 or more.

Including the surfactant (B) containing a water-soluble polymer (C1) to the conductive composition of the fifth embodiment is preferred since coating properties of the conductive composition improve and surface roughness of the conductive coating film is reduced. Also, such a setting is preferred since migration of components having low molecular weight of the surfactant from the conductor to the resist surface is suppressed, thus suppressing phenomena such as a reduction in the film thickness of the resist layer.

In the fifth embodiment, when the surfactant (B) contains a water-soluble polymer (C1), the content of the surfactant (B) in the conductive composition is preferred to be 0.01 to 50 mass %, more preferably 0.1 to 20 mass %.

(Other Components)

To enhance coating properties, the conductive composition of the fifth embodiment may contain alcohol or another surfactant other than the one mentioned above within a scope that does not deviate from the effects of the present invention.

As for the alcohol, water-soluble alcohols are preferred; for example, methanol, ethanol, 2-propanol, 1-propanol, 1-butanol and the like may be used.

As for a surfactant, for example, fatty alcohols, alkylglycoside, polyalkyl glycol and the like may be used. Specific examples are alcohols having 8 to 20 carbon atoms.

Method for Producing Conductive Composition of the Fifth Embodiment

The conductive composition according to the fifth embodiment of the present invention is preferred to include a step for mixing a conductive polymer (A), a basic compound (E2) and a surfactant as needed. A refined conductive polymer (A1) described in the fourth embodiment above is preferred to be used as a conductive polymer (A).

As described in the production method for a conductive polymer (A1) in the fourth embodiment above, a refined conductive polymer (A1) is obtained by being dispersed or dissolved in an aqueous medium such as water (hereinafter, such a conductive polymer (A1) is referred to as a "conductive polymer (A1) solution"). Thus, an aspect of the production method of a conductive composition of the fifth embodiment is to produce a conductive composition by a method that includes a step for adding a basic compound (E2) and a surfactant as needed (for example, the surfactant (B) above) into a conductive polymer (A1) solution.

Conditions of adding a basic compound (E2) into a conductive polymer (A) solution are not limited specifically; a basic compound (E2) may be added to a conductive polymer (A) solution at any selected temperature and rate. However, it is preferred to keep a conductive polymer (A) solution at room temperature and to add a basic compound (E2) while the mixture is being stirred.

In the present application, "room temperature" indicates 25° C.

If a conductive polymer (A) is solid, the solid conductive polymer (A), a basic compound (E2) and an aqueous medium and a surfactant (for example, the surfactant (B) above) are combined as needed to produce a conductive composition. At that time, it is preferred to prepare a conductive polymer solution in advance by mixing a solid conductive polymer (A) and an aqueous medium, and to add a basic compound (E2) and a surfactant as needed into the obtained conductive polymer solution. Namely, the method is preferred to include a step for preparing a conductive polymer (A) solution by mixing a solid conductive polymer (A) and an aqueous medium, and a step for adding a basic compound (E2) and a surfactant as needed into the conductive polymer (A) solution obtained in the previous step.

As for the aqueous medium, water, a water-soluble organic solvent, or a mixed solvent of water and water-soluble organic solvent may be used as described above in the method for refining a conductive polymer (A).

(Effects)

The conductive composition according to the fifth embodiment of the present invention contains a basic compound (E2) in addition to a conductive polymer (A). The basic compound (E2) is capable of reacting with residual monomers and sulfate ions more effectively to form stable salts. Moreover, since the basic compound (E2) is also capable of stabilizing the acidic group of the conductive polymer (A) (namely, stable salts are formed by the acidic group and the basic compound), elimination of the acidic group is suppressed when heat is applied.

The basic compounds described in Patent Literatures 2 to 6 can also stabilize the acidic group of a conductive polymer (A) to a certain degree, but due to their molecular weights or physical properties such as strong base properties, those basic compounds are unable to fully stabilize acidic groups.

As described, the conductive composition of the fifth embodiment is capable of forming a conductive coating film, from which acidic substances (residual monomers, sulfate ions, acidic groups eliminated from conductive polymer (A) when heated) are less likely to migrate to the resist layer.

Thus, especially when patterns are formed using a chemically amplified resist and by irradiating charged particle beams, migration of acidic substances to the resist layer is suppressed, thereby suppressing adverse effects such as a reduction in the film thickness of the resist layer. Accordingly, the conductive composition of the fifth embodiment sufficiently satisfies properties required as the wiring of semiconductors has become finer in recent years.

In addition, since acidic substances (residual monomers, sulfate ions) have been removed in a conductive polymer (A) refined by ion-exchange methods or the like, migration of acidic substances to the resist layer is suppressed effectively. Moreover, by refining a conductive polymer (A), basic substances (basic reaction auxiliary, ammonium ions) can also be removed, and migration of such basic substances to the resist layer is suppressed as well.

The conductive composition of the fifth embodiment contains a basic compound (E2). Since a basic compound (E2) has both a hydrophilic part and a hydrophobic part, it also exhibits surface activity the same as the water-soluble polymer, namely, the surfactant (B). Thus, the conductive composition of the fifth embodiment shows excellent coating performance without containing a surfactant. If it further contains a surfactant, coating properties are even more enhanced.

If the proportion of the conductive polymer (A) in the conductive composition of the fifth embodiment decreases, the proportion of acidic groups that could be eliminated by heat will inevitably become smaller. Accordingly, the amount of acidic group migrating to the resist layer decreases as well, thereby lowering adverse effects such as a reduction in the film thickness of the resist layer.

If the conductive composition contains a conductive polymer, namely, a surfactant, the relative proportion of the conductive polymer (A) in the conductive composition decreases. Accordingly, adverse effects such as a reduction in the film thickness of the resist layer are lowered even more.

Another aspect of the conductive composition according to the fifth embodiment of the present invention is as follows: the conductive composition contains a conductive polymer (A), a basic compound (E2) and water, wherein the basic compound (E2) is a quaternary ammonium salt in which at least one of four groups bonded to a nitrogen atom is an alkyl group having 3 or more carbon atoms, based on the total mass of the conductive composition, the content of the conductive polymer (A) is 0.01 to 30 mass %, the content of the basic compound (E2) is 0.001 to 10 mass % and the content of water is 50 to 99.5 mass %; and the total content of each component does not exceed 100 mass %.

Another aspect of the conductive composition of the fifth embodiment is as follows: the conductive composition contains a conductive polymer (A), a basic compound (E2) and water, wherein the conductive polymer (A) contains a monomer unit having at least one acidic group selected from the group consisting of sulfonic acid groups and carboxyl groups, the basic compound (E2) is at least one compound selected from the group consisting of tetrabutylammonium hydroxide, tetrapropylammonium hydroxide, tetrapentylammonium hydroxide and tetrahexylammonium hydroxide, and the molar ratio of the basic compound (E2) to the monomer unit is 1:0.1 to 1:1.

Sixth Embodiment: Conductive Composition

A conductive composition according to the sixth embodiment of the present invention contains a conductive polymer (A) and a basic compound (E3). The conductive composition is characterized by the following: the conductive polymer (A) contains a monomer unit having an acidic group, the basic compound (E3) has a basic group and two or more hydroxyl groups in the molecule, and with the melting point of 30° C. or more, and the content of the basic compound (E3) in the conductive composition is 0.6 to 0.8 mol, relative to 1 mol of the monomer unit having an acidic group in conductive polymer (A).

In addition, the conductive composition is preferred to contain a surfactant (B).

Furthermore, the surfactant (B) is preferred to contain a water-soluble polymer (C) having a nitrogen-containing functional group and a terminal hydrophobic group, and in the conductive composition, the content of a compound (D1) with an octanol/water partition coefficient (Log Pow) of 4 or more is preferred to be 0.001 mass % or less, relative to the total mass of the conductive composition.

Also, the monomer unit having an acidic group in the conductive polymer (A) is preferred to be a monomer unit represented by the following general formula (1).

[Chemical formula 22]

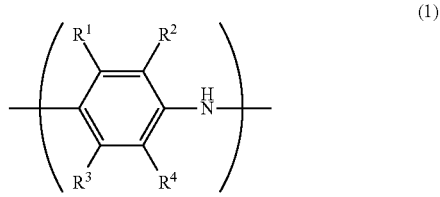

(In formula (1), $R^1$ to $R^4$ each independently represents a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. Also, at least one of $R^1$ to $R^4$ represents an acidic group or salt thereof.)

The acidic group is preferred to be at least one acidic group selected from the group consisting of sulfonic acid groups and carboxyl groups.

Namely, an aspect of the sixth embodiment of the present invention is as follows:

[1] A conductive composition containing a conductive polymer (A) which has at least one acidic group selected from the group consisting of sulfonic acid groups and carboxyl groups, and a basic compound (E3) which has a basic group and two or more hydroxyl groups in the molecule and with the melting point of 30° C. or more, wherein the content of the basic compound (E3) is 0.6 to 0.8 mol equivalent, relative to 1 mol of a unit, which has at least one acidic group selected from the group consisting of sulfonic acid groups and carboxyl groups, among the units forming the conductive polymer (A).

[2] The conductive composition described in [1], further containing a water-soluble polymer (excluding the conductive polymer (A)).

[3] The conductive composition described in [1] or [2], wherein the conductive polymer (A) has a monomer unit represented in the following general formula (1).

[Chemical formula 23]

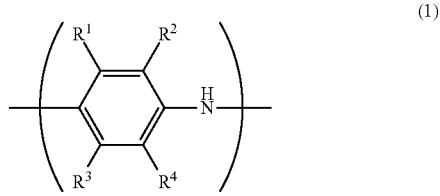

In formula (1), $R^1$ to $R^4$ each independently represent a hydrogen atom, a straight-chain or branched-chain alkyl group having 1 to 24 carbon atoms, a straight-chain or branched-chain alkoxyl group having 1 to 24 carbon atoms, an acidic group, a hydroxyl group, a nitro group or a halogen atom. In addition, at least one of $R^1$ to $R^4$ represents an acidic group. Here, an acidic group represents a sulfonic acid group or a carboxyl group.

[4] A conductive coating film formed by the conductive composition described in any one of [1] to [3].

The conductive composition according to the sixth embodiment of the present invention contains a conductive polymer (A) and a basic compound (E3). In addition, the conductive composition of the present embodiment is preferred to contain a surfactant (B).

The conductive polymer (A) and surfactant (B) in the conductive composition of the sixth embodiment are the same as the conductive polymer (A) and the surfactant (B) contained in the conductive composition of the fifth embodiment described above. Thus, their descriptions are omitted here.

(Basic Compound (E3))

A basic compound (E3) has a basic group and two or more hydroxyl groups in the molecule, and with the melting point of 30° C. or more.

When a compound has only a basic group in the molecule, it is difficult to efficiently form salts with the acidic group of the conductive polymer (A). Thus, when heat is applied to the conductive polymer (A), the acidic group of the conductive polymer (A) tends to be eliminated and the eliminated acidic group tends to migrate to the resist layer. On the other hand, if a compound has only hydroxyl groups in the molecule, salts are not formed with the acidic group of the conductive polymer (A). Also, if the number of hydroxyl groups in the molecule is one, or the melting point is lower than 30° C., salts are not formed efficiently with the acidic group either, due to insufficient fluidity or the like of the compound in the conductive composition. Accordingly, the effect of suppressing migration of the acidic group to the resist layer is not sufficiently achieved.

The number of hydroxyl groups in a basic compound (E3) is preferred to be 3 or more, considering the effect of suppressing migration of the acidic group to the resist layer, the ease of obtaining the compound, and processability. In addition, the upper limit of the number of hydroxyl groups in a basic compound (E3) is preferred to be 8 or less, considering the ease of obtaining the compound. Namely, the number of hydroxyl groups in a basic compound (E3) is preferred to be 2 to 8, more preferably 3 to 6.

The melting point of a basic compound (E3) is preferred to be 50° C. or more, more preferably 100° C. or more, even more preferably 150° C. or more, considering the effect of suppressing migration of the acidic group to the resist layer.

Here, if the melting point of a basic compound (E3) is too high, it is difficult to efficiently form salts with the acidic group because the dissolubility in a solvent is lowered or the like. Accordingly, the effect of suppressing migration of the acidic group to the resist layer is less likely to be achieved sufficiently. Thus, considering the effect of suppressing migration of the acidic group to the resist layer, and dissolubility in a solvent, the melting point of a basic compound (E3) is preferred to be 300° C. or less, more preferably 250° C. or less, even more preferably 200° C. or less. Namely, the melting point of a basic compound (E3) is preferred to be 30 to 300° C., more preferably 40 to 250° C., even more preferably 50 to 200° C.

Basic groups are those defined as Arrhenius bases, Bronsted bases, Lewis bases and the like, for example. Specific examples are ammonia and the like.

The hydroxyl group may be in —OH or may be protected by a protective group. Examples of protective groups are acetyl groups; silyl groups such as trimethylsilyl groups, t-butyl dimethylsilyl groups; acetal protective groups such as methoxymethyl groups, ethoxymethyl groups and methoxyethoxymethyl groups; benzoyl groups; alkoxide groups and the like.

Examples of a basic compound (E3) are 2-amino-1,3-propanediol, tris(hydroxymethyl)aminomethane, 2-amino-2-methyl-1,3-propanediol, 2-amino-2-ethyl-1,3-propanediol, 3-[N-tris(hydroxymethyl)methylamino]-2-hydroxypropansulfonic acid, N-tris(hydroxymethyl)methyl-2-aminoethane sulfonic acid and the like. Among those, tris(hydroxymethyl)aminomethane is preferred from the viewpoint of excellent solubility and basic properties.

Those compounds may be used alone or in combination of two or more in any proportion.

The content of a basic compound (E3) in the conductive composition according to the sixth embodiment of the present invention is 0.6 to 0.8 mol to 1 mol of a monomer unit having at least one acidic group selected from the group consisting of sulfonic acid groups and carboxyl groups, among the monomer units in the conductive polymer (A).

Namely, if the molar ratio of a basic compound (E3) to the monomer unit is 1:0.6 to 1:0.8, the acidic group in the conductive polymer (A) is stabilized. Especially, the content of a basic compound (E3) to 1 mol of the monomer unit is preferred to be 0.65 to 0.75 mol, that is, the molar ratio of 1:0.65 to 1:0.75, since the acidic group in the conductive polymer (A) is especially stabilized at such a ratio.

Namely, the content of a basic compound (E3) in the conductive composition of the sixth embodiment is preferred to be 0.001 to 10 mass %, more preferably 0.01 to 5 mass %, relative to the total mass of the conductive composition.

In addition, the content of a conductive polymer (A) in the conductive composition of the sixth embodiment is preferred to be 0.01 to 30 mass %, more preferably 0.05 to 10 mass %, relative to the total mass of the conductive composition.

(Other Components)

To enhance coating properties, the conductive composition of the sixth embodiment may contain alcohol or another surfactant other than the surfactant (B) above within a scope that does not deviate from the effects of the present invention. Those alcohols and surfactants are the same as the other components contained in the conductive composition of the first embodiment described above.

Method for Producing Conductive Composition of the Sixth Embodiment

The conductive composition according to the sixth embodiment of the present invention is obtained by using a basic compound (E3) instead of a basic compound (E2) in the production method of a conductive composition described above in the fifth embodiment.

(Effects)

The conductive composition according to the sixth embodiment of the present invention includes a basic compound (E3) in addition to a conductive polymer (A). The basic compound (E3) is capable of reacting with residual monomers and sulfate ions more effectively to form stable salts. Moreover, since the basic compound (E3) is also capable of stabilizing the acidic group of the conductive polymer (A) (namely, capable of forming stable salts from an acidic group and the basic compound), elimination of acidic groups caused by heat is suppressed.

As described, the conductive composition of the sixth embodiment is capable of forming a conductive coating film in which acidic substances (residual monomers, sulfate ions, acidic groups eliminated from conductive polymer (A) when heated) are less likely to migrate to the resist layer.

Thus, especially when patterns are formed using a chemically amplified resist and by irradiating charged particle beams, migration of acidic substances to the resist layer is suppressed, thereby suppressing adverse effects such as a reduction in the film thickness of the resist layer. Accordingly, the conductive composition of the sixth embodiment sufficiently satisfies the properties required as the wiring of semiconductors has become finer in recent years.

In addition, since acidic substances (residual monomers, sulfate ions) have been removed in a conductive polymer (A) refined by ion-exchange methods or the like, migration of acidic substances to the resist layer is suppressed effectively. Moreover, by refining a conductive polymer (A), basic substances (basic reaction auxiliary, ammonium ions) are also removed, and migration of such basic substances to the resist layer is suppressed as well.

Moreover, if a surfactant (B) is further contained, coating properties will be even more enhanced, while the relative ratio of the conductive polymer (A) in the conductive composition is reduced. Thus, adverse effects such as a reduction in the film thickness of the resist layer are further lowered.

(Usage Purposes)

The conductive compositions of the fifth and sixth embodiments are used for a conductive coating film applied on a resist surface especially in a pattern-forming method using chemically amplified resist and charged particle beams, and for capacitors, transparent electrodes, semiconductor materials and the like.

Among them, when the conductive composition is used for forming a conductive coating film on a resist surface in a pattern-forming method using chemically amplified resist and by irradiating charged particle beams, after the conductive composition of the fifth or six embodiment of the present invention is coated on the resist surface by a coating method, patterns are formed by irradiating charged particle beams. Accordingly, migration of acidic substances from the conductive composition to the resist layer is suppressed, and desired resist patterns are formed.

(Conductive Coating Film)

Using the conductive compositions of the fifth or sixth embodiment of the present invention, a conductive coating film is formed by applying the conductive composition on a resist layer formed on a silicon wafer, quartz mask substrate and the like and by drying the film. Examples of a coating method are gravure coater, roll coater, curtain-flow coater, spin coater, bar coater, reverse coater, kiss coater, fountain coater, rod coater, air doctor coater, knife coater, blade coater, casting coater and screen coater; a spray method of spray coating; and immersion methods such as dipping. Among those, spin coating is preferred.

(Effects)

A conductive coating film formed by the conductive composition according to the fifth or the sixth embodiment is capable of lowering or suppressing migration of acidic substances to the resist layer. Thus, a reduction in the film thickness or the like of the resist layer is suppressed.

Another aspect of the conductive composition of the sixth embodiment of the present invention is as follows: a conductive composition contains a conductive polymer (A), a basic compound (E3), and water, wherein the conductive polymer (A) contains a monomer unit having an acidic group; the basic compound (E3) is at least one compound selected from the group consisting of 2-amino-1,3-propanediol, tris(hydroxymethyl)aminomethane, 2-amino-2-methyl-1,3-propanediol, 2-amino-2-ethyl-1,3-propanediol, 3[N-tris(hydroxymethyl)methylamino]-2-hydroxypropane sulfonic acid, and N-tris(hydroxymethyl)methyl-2-aminoethane sulfonic acid, the content of the basic compound (E3) in the conductive composition is 0.6 to 0.8 mol, relative to 1 mol of a monomer unit having an acidic substituent of the conductive polymer (A), and the proportion of the conductive polymer (A) is 0.01 to 30 mass %, relative to the total mass of the conductive composition.

In addition, another aspect of the conductive composition of the sixth embodiment is as follows: a conductive composition contains a conductive polymer (A), a basic compound (E3), a surfactant (B) and water, wherein the conductive polymer (A) contains a monomer unit having an acidic group; the basic compound (E3) is at least one compound selected from the group consisting of 2-amino-1,3-propanediol, tris(hydroxymethyl)aminomethane, 2-amino-2-methyl-1,3-propanediol, 2-amino-2-ethyl-1,3-propanediol, 3-[N-tris(hydroxymethyl)methylamino]-2-hydroxypropane sulfonic acid, and N-tris(hydroxymethyl)methyl-2-aminoethane sulfonic acid, the surfactant (B) contains a water-soluble polymer (C) having a nitrogen-containing functional group and a terminal hydrophobic group, the content of a compound (D1) with an octanol/water partition coefficient (Log Pow) of 4 or more in the conductive composition is 0.001 mass % or less, relative to the total mass of the conductive composition, based on the total mass of the conductive composition, the content of the conductive polymer (A) is 0.01 to 30 mass %, the content of the basic compound (E3) is 0.001 to 10 mass %, the content of the surfactant (B) is 0.01 to 50 mass % and the content of water is 50 to 99.5 mass %; and the total content of each component does not exceed 100 mass %.

Laminate According to the Seventh Embodiment of the Present Invention

A laminate according to the seventh embodiment of the present invention has a substrate, a conductive coating film and an electron-beam resist film, wherein the electron-beam resist film is laminated on the substrate, and the conductive coating film is laminated on the electron-beam resist film, the surface resistance value of the laminate is $5 \times 10^{10} \Omega/\square$ or less, the surface roughness (Ra1 value) of the conductive coating film measured by a stylus profiler is 0.7 nm or less, the surface roughness (Ra2 value) of the conductive coating film measured by a scanning probe microscope is 0.35 nm or less, and the conductive coating film is formed with a conductive composition containing a conductive polymer (A).

Figure 2:
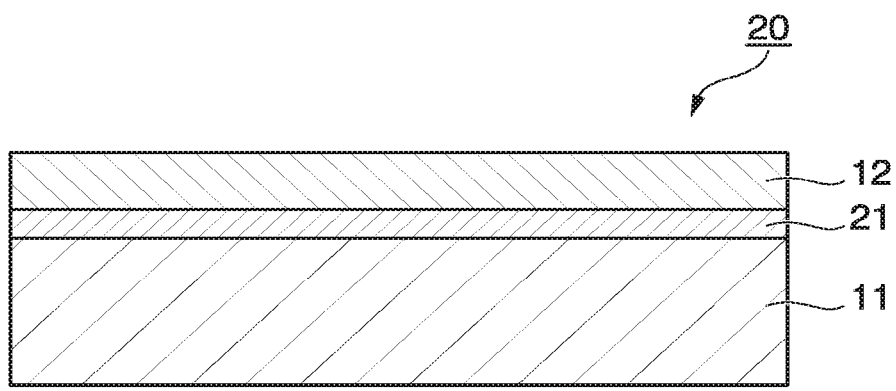
FIG. 2 is a cross-sectional view showing an example of the laminate related to the present invention.

FIG. 2 is a cross-sectional view showing an example of the laminate according to the seventh embodiment of the present invention. Laminate 20 has a structure where electron-beam resist layer 21 is laminated on substrate 11, and conductive coating film 12 is laminated on the electron-beam resist layer.

For the sake of description, measurement ratios in FIG. 2 are different from actual ratios.

The same substrate as that described in the first embodiment above may be used here. In addition, as for the conductive composition containing a conductive polymer (A), those described in the second through sixth embodiments above are preferred.

Regarding a conductive coating film of the laminate, the surface roughness (Ra1 value) measured by a stylus profiler and the surface roughness (Ra2 value) measured by a scanning probe microscope are measured by employing the measurement methods respectively described in the first embodiment above. The preferred range of the Ra1 values and Ra2 values are the same as those described in the first embodiment above.

Method for Forming Laminate of the Seventh Embodiment

A method for forming a laminate of the seventh embodiment of the present invention is preferred to include step (1)

for forming an electron-beam resist film by coating electron-beam resist on at least one surface of a substrate and by drying the resist, and step (2) for forming a conductive coating film on the electron-beam resist film by coating a conductive composition containing a conductive polymer (A) and by drying the composition.

(Step (1))

A method for coating electron-beam resist on at least one surface of a substrate is not limited specifically as long as the effects of the present invention are achieved. For example, preferred methods are spin coating, spray coating, dip coating, roll coating, gravure coating, reverse coating, roll brushing, air knife coating and curtain coating methods and the like. Among them, spin coating is preferred because of the ease of processing.

In addition, an electron-beam resist film is formed by coating electron-beam resist on a substrate surface using the above coating method, and then by applying heat at a temperature recommended for the resist.

The electron-beam resist is not limited specifically as long as the effects of the present invention are achieved. A chemically amplified resist, for example, FEP-171 resist made by FUJIFILM Arch Co. Ltd., may be used.

(Step (2))

A conductive composition containing a conductive polymer (A) is coated on the electron-beam resist film obtained by step (1), and the composition is dried. Accordingly, a laminate of the seventh embodiment is formed.

Examples of a method for coating a conductive composition on the electron-beam resist film are the same as those listed as coating methods. Preferred examples are the same as well.

After a conductive coating film is formed by coating a conductive composition, the substrate is kept at 25° C. for 10 to 60 minutes or heat treatment is conducted on the substrate so that a laminate is formed.

When heat is applied, the treatment is preferred to be conducted at 60 to 90° C. for 1 to 5 minutes, more preferably at 70 to 80° C. for 1 to 3 minutes.

The film thickness of a conductive coating film formed in step (2) is preferred to be 1 to 100 nm, more preferably 3 to 60 nm, especially preferably 5 to 30 nm.

Regarding the laminate of the seventh embodiment, the surface resistance value of the laminate is $5 \times 10^{10} \Omega/\square$ or less, the surface roughness (Ra1 value) of the conductive coating film measured by a stylus profiler is 0.7 nm or less, and the surface roughness (Ra2 value) of the conductive coating film measured by a scanning probe microscope is 0.35 nm or less. Accordingly, the laminate is applicable to a next-generation process for semiconductor devices.

EXAMPLES

In the following, the present invention is described in further detail by referring to examples. However, the following examples do not limit the scope of the present invention. In addition, "%" in the following examples indicates "mass %."

First, examples of the first embodiment of the present invention are described.

<Evaluation of Molecular Weight>

For each of a water-soluble polymer (C) and a water-soluble polymer (C1), 0.1 wt % solution was filtrated through a 0.45 μm-membrane filter to prepare a sample. The sample was measured by GPC under conditions below to evaluate weight average molecular weights of the water-soluble polymer (C) and water-soluble polymer (C1) respectively.

Measuring instrument: TOSOH GPC-8020 (made by Tosoh Corporation)

Eluent: 0.2M-NaNO$_3$-DIW/acetonitrile=80/20 (v/v)

Column temperature: 30° C.

Calibration curve: created using EasiVial™ polyethylene glycol/oxide (made by Polymer Lab Inc.)

<Evaluation of Conductivity: Conductor>

The surface resistance [Ω] of a conductive coating film was measured by a 2-terminal method (distance between electrodes at 20 mm) using Hiresta MCP-HT260 (made by Mitsubishi Chemical Corporation).

<Evaluation of Conductivity: Laminate>

A laminate was obtained by the following procedure:

Chemically amplified electron-beam resist (for example, commercially available positive type resist FEP-171 made by FUJIFILM Electronic Materials Co., Ltd., hereinafter referred to as "resist") was spin-coated (2000 rpm×60 seconds) on a 4 cm×4 cm glass plate, and heat was applied using a hot plate at 130° C. for 2 minutes to form a coating film with an approximate film thickness of 200 nm; then, after a conductive composition was spin-coated (2000 rpm× 60 seconds), heat was applied using a hot plate at 80° C. for 2 minutes to form a conductive coating film with an approximate film thickness of 20 nm. The surface resistance [0] of the laminate was measured by a 2-terminal method (distance between electrodes at 20 mm) using Hiresta MCP-HT260 (made by Mitsubishi Chemical Corporation).

<Evaluation of Surface Roughness>

After a conductive composition was spin-coated (2000 rpm×60 seconds) on a 4-inch silicon wafer, heat was applied using a hot plate at 80° C. for 2 minutes to form a conductor with an approximate film thickness of 20 nm.

(Ra1 value)

The surface roughness (Ra1 value, [nm]) of the obtained conductor was measured using a stylus profiler (Stylus Profiler P-16+, made by KLA Tencor Corporation).

Stylus: 2 um R60°

Needle pressure: 0.03 mg

Scanning range: 500 um

Scanning speed: 2 um/s (Ra2 value)

The surface roughness (Ra2 value, [nm]) of the obtained conductor was measured using a scanning probe microscope (Olympus OLS 3500).

Measurement mode: dynamic

Scanning range: 1000 nm

Scanning speed: 0.3 Hz

I Gain: 1000

Sensor lever: Olympus OMCL-AC240TS-C2

<Measuring Glass Transition Temperature>

Using 5 mg of powdered water-soluble polymer (C) or water-soluble polymer (C1), DSC was measured under the conditions below and the glass transition temperature of a water-soluble polymer (C) or a water-soluble polymer (C1) was evaluated.

Measuring instrument: Thermoplus EVO DSC 8230 (made by Rigaku Corporation)

Atmosphere: nitrogen

Flow rate: 50 mL/min

Rate of temperature rise: 150° C. (10° C./min), 20° C. (50° C./min), 150° C. (10° C./min)

Reference: alumina

<Content of Compound (D1) Having Log Pow of 4 or More>

A water-soluble polymer (C) or a water-soluble polymer (C1) was diluted by acetone and subjected to analysis by gas chromatography under the conditions below. The structure of the observed peaks was identified, and a Log Pow was calculated by Chem Draw Pro 12.0 made by Cambridge Soft. Then, regarding a compound (D1) having a Log Pow of 4 or more, its content in terms of n-dodecyl mercaptan was determined using an internal standard method by gas chromatography.

Measuring Conditions
Instrument: model 6890 N, made by Agilent Technologies, Inc.
Detector: 5973 Mass Selective Detector
Column: UA-5 (30 m×0.25 mm×0.25 μm) made by Frontier Laboratories Ltd.
Conditions to raise GC temperature: 40° C. (1 min. hold), 5° C./min to 300° C. (5 min. hold)
GC inlet temperature: 160 [° C.]
Carrier gas: He, flow rate of 1 [mL/min]
Split ratio: 20/1
MS ion source temperature: 230° C.
MS quadruple temperature: 150° C.
Ionization method: electron ionization (ionization voltage: 70V)

<Evaluation by Film Reduction Test>
(Reduction in the Film Thickness of the Resist)

A reduction in the film thickness of a resist was evaluated as follows.

(1) forming resist film: after 0.4 um of chemically amplified resist was spin-coated at 2000 rpm/60 seconds on a 4-inch silicon wafer (substrate), the solvent was removed through prebake at 130° C. for 90 seconds.

(2) measuring thickness of resist film: part of the resist formed on the substrate was peeled to measure the initial resist film thickness (A) (nm) based on the substrate surface using a stylus profiler (Stylus Profiler P-16+, made by KLA-Tencor Corporation).

(3) forming conductive coating film: on the resist surface coated on the substrate, after 2 mL of conductive compositions of the second to sixth embodiments were each dropped so as to cover the entire resist surface, the composition was spin-coated at 2000 rpm/60 seconds using a spin coater. Accordingly, a conductive coating film with a film thickness of 30 nm was obtained.

(4) baking: the substrate with laminated resist and conductive coating film was heated on a hot plate under air atmosphere at 120° C. for 20 minutes, and then the substrate was kept under air atmosphere at room temperature (25° C.) for 90 seconds.

(5) washing with water: after the conductive coating film was washed away with 20 mL of water, the substrate was rotated at 2000 rpm/60 seconds using a spin coater to remove the water on the resist surface.

(6) developing: 20 mL of a developing solution made of a solution containing 2.38 mass % tetramethylammonium hydroxide (TMAH) was dropped on the resist surface. After the substrate was kept standing for 60 seconds, the developing solution was removed by spin coating the substrate at 2000 rpm, and was dried by maintaining the rotation for 60 seconds.

(7) After removing part of the resist positioned within 5 mm from the portion where part of the resist was peeled in step (2) above, resist film thickness (B) (nm) was measured after development using a stylus profiler.

(8) A reduction in the film thickness (C) of the resist (C=A−B) was calculated by subtracting (B) from the value (A) above.

(Standard Reduction in Film Thickness)

Each resist has a reduction in film thickness (D) (nm) specific to a storage period after the resist film is formed (hereinafter referred to as a standard reduction in film thickness). Such a reduction in film thickness (D) unrelated to conductive coating film was measured in advance as follows.

(1) forming resist film: after 0.4 um of chemically amplified resist was spin-coated at 2000 rpm/60 seconds on a 4-inch silicon wafer (substrate), the solvent was removed through prebake at 130° C. for 90 seconds.

(2) measuring thickness of resist film: part of the resist formed on the substrate was peeled to measure the initial resist film thickness (E) (nm) by a stylus profiler based on the substrate surface.

(3) baking: the substrate with laminated resist was heated on a hot plate under air atmosphere at 120° C. for 20 minutes, and then the substrate was kept standing under air atmosphere at room temperature (25° C.) for 90 seconds.

(4) developing: 20 mL of a developing solution made of a solution containing 2.38 mass % TMAH solution was dropped on the resist surface. After the substrate was kept standing for 60 seconds, the developing solution was removed by spin coating the substrate at 2000 rpm, and was dried by maintaining the rotation for 60 seconds.

(5) After removing part of the resist positioned within 5 mm from the portion where part of the resist was peeled in step (2) above, resist film thickness (F) (nm) was measured after development using a stylus profiler.

(6) A standard reduction in film thickness (D) of the resist (D=F−E) was calculated by subtracting (E) from the value (F) above.

<Evaluation of Crystalline Impurity>

The surface of a laminate was observed with a magnification of 1000 times using an industrial microscope (Nikon Eclipse LV 100).

Production Example 1A: Producing Conductive Polymer Solution (A-1)

A monomer solution was obtained by dissolving 1 mol of 3-aminoanisole-4-sulfonic acid at 0° C. in 300 mL of a pyridine solution of a 4 mol/L concentration (solvent: water/acetonitrile=3/7). Meanwhile, an oxidizing agent solution was prepared by dissolving 1 mol of ammonium peroxodisulfate in 1 L of a water/acetonitrile=3/7 solution. Next, the monomer solution was dropped while the oxidizing agent solution was cooled at 5° C. After the dropping was completed, the mixture was further stirred at 25° C. for 12 hours, and a conductive polymer was obtained. Then, the reaction mixture containing the conductive polymer was filtrated by a centrifugal separator. Further, the mixture was washed with methanol and dried. Accordingly, 185 grams of powdered conductive polymer (A-1) was obtained.

Production Example 2A: Producing Conductive Polymer Solution (A1-1)

20 grams of conductive polymer (A-1) obtained in production example 1A above was dissolved in a mixed solvent of 940 grams of pure water and 40 grams of 2-propanol. Accordingly, 1000 grams of a conductive polymer solution (A1-1) with a solid content of 2 mass % was obtained.

500 mL of cationic ion exchange resin washed with ultrapure water ("Amberlite 1R-120B" made by Organo Chemical Co., Ltd.) was filled in a column.

Then, 1000 grams of the conductive polymer solution (A1-1) was passed through the column at a speed of 50 mL/min (SV=6), and 900 grams of a conductive polymer solution (A1-1) from which basic substances or the like were removed was obtained.

Next, 500 mL of anionic ion exchange resin washed with ultrapure water ("Amberlite IRA410" made by Organo Chemical Co., Ltd.) was filled in a column.

Then, 900 grams of the conductive polymer solution (A1-1) was passed through the column at a speed of 50 mL/min (SV=6), and 800 grams of a conductive polymer solution (A1-1-1) from which basic substances or the like were removed was obtained.

When composition analysis was conducted on the conductive polymer solution (A1-1) by ion chromatography, 80% of residual monomers, 99% of sulfate ions and 99% or more of basic substances were found to have been removed.

Here, 1 sverdrup (SV) is defined as $1 \times 10^6$ m³/s (1 GL/s)

Production Example 3A: Producing Water-Soluble Polymer (C-1)

A reaction mixture was obtained by dissolving 55 grams of N-vinylpyrrolidone as a vinyl monomer having a nitrogen-containing functional group, 3 grams of azobisisobutyronitrile as a polymerization initiator, and 1 gram of n-dodecyl mercaptan as a chain transfer agent for introducing a terminal hydrophobic group into 100 mL of isopropyl alcohol as a solvent while the mixture was stirred. Next, in 100 mL of isopropyl alcohol heated to 80° C. in advance, the reaction mixture was dropped at a dropping speed of 1 mL/min to conduct dropping polymerization. The dropping polymerization was conducted while isopropyl alcohol was retained at 80° C. After the dropping was completed, the reactant solution was further aged at 80° C. for 2 hours and cooled. Then, the solution was vacuum concentrated, and the resultant reaction product was dissolved again in a small amount of acetone. The acetone solution of the reaction product was dropped into a large amount of n-hexane. The resultant white precipitate was filtrated, washed with n-hexane and dried. Accordingly, 45 grams of a water-soluble polymer (C-1) was obtained. [water-soluble polymer (C1-1): weight average molecular weight: 1300, terminal hydrophobic group: alkylthio group having 12 carbon atoms; glass transition temperature: 51° C.]

Production Example 4A: Producing Water-Soluble Polymer (C-2)

A reaction mixture was obtained by dissolving 55 grams of N-vinylpyrrolidone as a vinyl monomer having a nitrogen-containing functional group, 3 grams of azobisisobutyronitrile as a polymerization initiator, and 1 gram of n-dodecyl mercaptan as a chain transfer agent for introducing a terminal hydrophobic group into 100 mL of isopropyl alcohol as a solvent while the mixture was being stirred. Next, in 100 mL of isopropyl alcohol heated to 80° C. in advance, the reaction mixture was dropped at a dropping speed of 1 mL/min to conduct dropping polymerization. The dropping polymerization was conducted while isopropyl alcohol was retained at 80° C. After the dropping was completed, the reactant solution was further aged at 80° C. for 2 hours. Then the solution was cooled and vacuum concentrated to obtain a white mixture of water-soluble polymer (C-2). The water-soluble polymer (C-2) contained 1-pyrrolidine-2-onyl group as the nitrogen-containing functional group and a dodecyl group as the terminal hydrophobic group. Also, in the water-soluble polymer (C-2), as the compound (D1) having a Log Pow of 4 or more, 2-(dodecylthio)-2-methylbutyronitrile (Log Pow of 6.5) was contained at 1.9 parts by mass based on 100 parts by mass of the water-soluble polymer (C-2), namely, at 1.9 mass % of the total mass of the water-soluble polymer (C-2).

Production Example 5A: Producing Water-Soluble Polymer (C1-1)

A reaction mixture was obtained by dissolving 55 grams of N-vinylpyrrolidone as a vinyl monomer having a nitrogen-containing functional group, 2 grams of azobisisobutyronitrile as a polymerization initiator, and 0.6 grams of n-dodecyl mercaptan as a chain transfer agent for introducing a terminal hydrophobic group into 100 mL of isopropyl alcohol as a solvent while the mixture was being stirred. Next, in 100 mL of isopropyl alcohol heated to 80° C. in advance, the reaction mixture was dropped at a dropping speed of 1 mL/min to conduct dropping polymerization. The dropping polymerization was conducted while isopropyl alcohol was retained at 80° C. After the dropping was completed, the reactant solution was further aged at 80° C. for 2 hours and cooled. Then, the solution was vacuum concentrated, and the resultant reaction product was dissolved again in a small amount of acetone. The acetone solution of the reaction product was dropped into a large amount of n-hexane. The resultant white precipitate was filtrated, washed with n-hexane and dried. Accordingly, 45 grams of a water-soluble polymer (C1-1) was obtained. [water-soluble polymer (C1-1): weight average molecular weight: 2000, terminal hydrophobic group: alkylthio group having 12 carbon atoms; glass transition temperature: 73° C.]

Production Example 6A: Producing Water-Soluble Polymer (C1-2)

A reaction mixture was obtained by dissolving 55 grams of N-vinylpyrrolidone as a vinyl monomer having a nitrogen-containing functional group, 1 gram of azobisisobutyronitrile as a polymerization initiator, and 0.15 gram of n-dodecyl mercaptan as a chain transfer agent for introducing a terminal hydrophobic group into 100 mL of isopropyl alcohol as a solvent while the mixture was being stirred. Next, in 100 mL of isopropyl alcohol heated to 80° C. in advance, the reaction mixture was dropped at a dropping speed of 1 mL/min to conduct dropping polymerization. The dropping polymerization was conducted while isopropyl alcohol was retained at 80° C. After the dropping was completed, the reactant solution was further aged at 80° C. for 2 hours and cooled. Then, the solution was vacuum concentrated, and the resultant reaction product was dissolved again in a small amount of acetone. The acetone solution of the reaction product was dropped into a large amount of n-hexane. The resultant white precipitate was filtrated, washed with n-hexane and dried. Accordingly, 45 grams of a water-soluble polymer (C1-2) was obtained. [water-soluble polymer (C1-2): weight average molecular weight: 2900, terminal hydrophobic group: alkylthio group having 12 carbon atoms; glass transition temperature: 110° C.]

Production Example 7A: Producing Water-Soluble Polymer (C1-3)

A reaction mixture was obtained by dissolving 55 grams of N-vinylpyrrolidone as a vinyl monomer having a nitrogen-containing functional group, 0.5 gram of azobisisobutyronitrile as a polymerization initiator, and 0.1 gram of n-dodecyl mercaptan as a chain transfer agent for introducing a terminal hydrophobic group into 100 mL of isopropyl alcohol as a solvent while the mixture was being stirred. Next, in 100 mL of isopropyl alcohol heated to 80° C. in advance, the reaction mixture was dropped at a dropping speed of 1 mL/min to conduct dropping polymerization. The dropping polymerization was conducted while isopropyl alcohol was retained at 80° C. After the dropping was completed, the reactant solution was further aged at 80° C. for 2 hours and cooled. Then, the solution was vacuum concentrated, and the resultant reaction product was dissolved again in a small amount of acetone. The acetone solution of the reaction product was dropped into a large amount of n-hexane. The resultant white precipitate was filtrated, washed with n-hexane and dried. Accordingly, 45 grams of a water-soluble polymer (C1-3) was obtained. [water-soluble polymer (C1-3): weight average molecular weight: 6150, terminal hydrophobic group: alkylthio group having 12 carbon atoms; glass transition temperature: 114° C.]

Using conductive polymers and water-soluble polymers obtained in production examples 1A to 7A, conductive compositions were respectively prepared as shown in Table 1.

TABLE 1

|  |  | conductive composition |  |  |  |  |
|---|---|---|---|---|---|---|
|  |  | 1A | 2A | 3A | 4A | 5A |
| conductive polymer [part by mass] | (A-1) | 1 | 1 | 1 | 1 | 1 |
|  | (A1-1) | — | — | — | — | — |
| water-soluble polymer [part by mass] | (C-1) | 1 | 0.98 | 0.92 | 0.8 | — |
|  | (C-2) | — | 0.02 | 0.08 | 0.2 | 1 |
|  | (C1-1) | — | — | — | — | — |
|  | (C1-2) | — | — | — | — | — |
|  | (C1-3) | — | — | — | — | — |
| water [part by mass] |  | 100 | 100 | 100 | 100 | 100 |

Examples 1 to 2, Comparative Examples 1 to 3

Conductors were formed by respectively using conductive compositions (1A) to (5A) shown in Table 1.

More specifically, after each conductive composition was spin-coated on a 4-inch silicon wafer (2000 rpm×60 seconds), heat was applied at 80° C. for 2 minutes on a hot plate to form a conductive coating film with a thickness of 20 nm. Accordingly, a conductor was obtained. The surface resistance value, surface roughness (Ra1 value), content of compound (D1), presence of crystals, and adverse effect of crystals on resist were evaluated according to the evaluation methods described above. The results are shown in Table 2.

TABLE 2

|  | conductive composition |  |  |  |  |
|---|---|---|---|---|---|
|  | example 1 1A | example 2 2A | comp. example 1 3A | comp. example 2 4A | comp. example 3 5A |
| content of compound (D1) [mass %] | 0.0006 | 0.001 | 0.002 | 0.004 | 0.019 |
| Ra1 value [nm] | 0.56 | 0.54 | 0.92 | 0.93 | 1.65 |
| Ra2 value [nm] | 0.259 | 0.261 | 0.265 | 0.26 | 0.258 |
| surface resistance [Ω/□] | 1.00E+09 | 1.00E+09 | 1.00E+09 | 1.00E+09 | 1.00E+09 |
| presence of crystals | no | no | yes | yes | yes |
| adverse effect on resist of crystals | none | none | medium | medium | significant |

From the results shown in Table 2, in examples 1 and 2, namely, when the content of a compound (D1) is 0.001 mass % or less, no crystals were observed on the coating film, and it was found that adverse effects on the resist were suppressed.

Next, examples of the conductive composition according to the third embodiment of the present invention are described.

<Evaluation of Conductivity>

The conductive composition was spin-coated (2000 rpm× 60 seconds) on a glass substrate, to which heat was applied on a hot plate at 80° C. for 2 minutes. Accordingly, a conductor (sample piece 1) was formed with a coating film having an approximate film thickness of 30 nm formed on the glass substrate.

The surface resistance value [Ω] of sample piece 1 was measured by a two-terminal method (distance between electrodes at 20 mm) using Hiresta MCP-HT260 (made by Mitsubishi Chemical).

<Surface Roughness>

The same method described in the examples of the first embodiment was employed to measure surface roughness (Ra1 value and Ra2 value).

<Reduction in Film Thickness>

The same method described in the examples of the first embodiment was employed to measure a reduction in the film thickness of the resist.

Using conductive polymers and water-soluble polymers obtained in production examples 1A to 7A, conductive compositions were respectively prepared as shown in Table 3.

TABLE 3

|  |  | conductive composition |  |  |  |
|---|---|---|---|---|---|
|  |  | 1B | 2B | 3B | 4B |
| conductive polymer [part by mass] | (A-1) | 0.7 | 0.7 | 0.7 | 0.7 |
|  | (A1-1) | — | — | — | — |
| water-soluble polymer [part by mass] | (C-1) | — | — | — | 0.3 |
|  | (C-2) | — | — | — | — |
|  | (C1-1) | 0.3 | — | — | — |
|  | (C1-2) | — | 0.3 | — | — |
|  | (C1-3) | — | — | 0.3 | — |
| water [part by mass] |  | 100 | 100 | 100 | 100 |

Examples 3 to 5

Using conductive compositions (1B) to (3B) shown in Table 3, conductivity and surface roughness evaluations and evaluation by film reduction testing were respectively performed according to the evaluation methods described above. The results are shown in Table 4.

Comparative Example 4

Using the conductive composition (4B) shown in Table 3, conductivity, surface roughness and impact on resist were evaluated according to the evaluation methods described above. The results are shown in Table 4.

TABLE 4

| | conductive composition | | | |
|---|---|---|---|---|
| | example 3 1B | example 4 2B | example 5 3B | comp. example 4 4B |
| added base | Py | Py | Py | Py |
| water-soluble polymer | C1-1 | C1-2 | C1-3 | C-1 |
| Ra1 value [nm] | 0.5 | 0.53 | 0.52 | 0.61 |
| Ra2 value [nm] | 0.324 | 0.304 | 0.28 | 0.371 |
| surface resistance [Ω/□] | 2.00E+07 | 2.00E+07 | 2.00E+07 | 2.00E+07 |
| reduction in film thickness [nm] | 3 | 3 | 3 | 4 |

In examples 3 to 5 prepared by combining a conductive polymer (A-1) and water-soluble polymers (C1-1) to (C1-3) each with a weight average molecular weight of 2000 or more, excellent results were obtained in both surface roughness and reduction in film thickness, compared with comparative example 4 which is prepared by combining a conductive polymer (A-1) and a water-soluble polymer (C1) with a weight average molecular weight of 1300.

From the above results, it was found that the conductive composition of the third embodiment, which contains a water-soluble polymer (C1) having a nitrogen-containing functional group and a terminal hydrophobic group and has a weight average molecular weight of 2000 or more, exhibits excellent coating properties and conductivity and is capable of forming a conductive coating film with excellent surface roughness and a less reduction in the film thickness of a laminate such as resist coated on a substrate.

Next, examples of the conductive composition according to the fourth embodiment of the present invention are described.

<Evaluation of Conductivity>

The same method described in the examples of the third embodiment was employed to evaluate conductivity.

<Surface Roughness>

The same method described in the examples of the third embodiment was employed to measure surface roughness (Ra1 value and Ra2 value).

<Reduction in Film Thickness>

The same method described in the examples of the third embodiment was employed to measure reduction in the film thickness of the resist.

(Production Example 8A: Producing Water-Soluble Polymer (C-3)>

In isopropyl alcohol heated to 80° C. in advance, 55 grams of N-vinylpyrrolidone, 3 grams of isobutyronitrile as a polymerization initiator and 1 gram of n-dodecyl mercaptan as a chain transfer agent were dropped while the internal temperature was maintained at 80° C. to conduct dropping polymerization. After the dropping was completed, the reaction mixture was further aged at 80° C. for 2 hours, cooled, vacuum concentrated and dissolved again in a small amount of acetone. The acetone solution of the polymer was dropped into a large amount of n-hexane. The resultant white precipitate was filtrated, washed and dried. Accordingly, 45 grams of a water-soluble polymer (C-3) was obtained. The weight average molecular weight of the water-soluble polymer (C-3) was 1300. In addition, when 1 part by mass of the water-soluble polymer (C-3) was dissolved in 100 parts by mass of water, its surface tension at 25° C. was 38 dyn/cm.

Example 6

Based on 100 parts by mass of a conductive polymer (A1-1) solution (conductive polymer: $8.8 \times 10^{-3}$ mol), 17 parts by mass of a 5% solution of 1,8-diazabicyclo[5.4.0]-7-undecene was added, and 0.06 parts by mass of a water-soluble polymer (C-1) was further added. Accordingly, a conductive composition (1C) was obtained. Various measurements and evaluations were conducted on the conductive composition (1C). The results are shown in Table 5.

Example 7

Except that a 5% solution of 1,8-diazabicyclo[5.4.0]-7-undecene in example 6 was replaced with 15 parts by mass of a solution of 1,5-diazabicyclo[4.3.0]-5-nonene, conductive composition (2C) was prepared the same as in example 6, and various measurements and evaluations were conducted. The results are shown in Table 5.

Example 8

Except that a 5% solution of 1,8-diazabicyclo[5.4.0]-7-undecene in example 6 was replaced with 11 parts by mass of a 5% solution of 4-dimethylaminopyridine, conductive composition (3C) was prepared the same as in example 6, and various measurements and evaluations were conducted. The results are shown in Table 5.

Example 9

Except that a 5% solution of 1,8-diazabicyclo[5.4.0]-7-undecene in example 6 was replaced with 9 parts by mass of a 5% solution of 4-dimethylaminopyridine, conductive composition (4C) was prepared the same as in example 6, and various measurements and evaluations were conducted. The results are shown in Table 5.

Example 10

Except that a 5% solution of 1,8-diazabicyclo[5.4.0]-7-undecene in example 6 was replaced with 15 parts by mass of a 5% solution of 4-dimethylaminopyridine, conductive composition (5C) was prepared the same as in example 6, and various measurements and evaluations were conducted. The results are shown in Table 5.

Example 11

Except that 15 parts by mass of a 5% solution of 4-dimethylaminopyridine in example 10 was changed to 17 parts by mass, conductive composition (6C) was prepared the same as in example 10, and various measurements and evaluations were conducted. The results are shown in Table 5.

Example 12

Except that a 5% solution of 1,8-diazabicyclo[5.4.0]-7-undecene in example 6 was replaced with 12 parts by mass of a 5% solution of aminopyridine (AP), conductive composition (7C) was prepared the same as in example 6, and various measurements and evaluations were conducted. The results are shown in Table 5.

Comparative Example 5

Except that a 5% solution of 1,8-diazabicyclo[5.4.0]-7-undecene in example 6 was not contained, conductive composition (8C) was prepared the same as in example 1, and various measurements and evaluations were conducted. The results are shown in Table 5

Comparative Example 6

Except that a 5% solution of 1,8-diazabicyclo[5.4.0]-7-undecene in example 6 was replaced with 10 parts by mass of a 5% solution of pyridine (Py), conductive composition (9C) was prepared the same as in example 6, and various measurements and evaluations were conducted. The results are shown in Table 5.

Comparative Example 7

Except that a 5% solution of 1,8-diazabicyclo[5.4.0]-7-undecene in example 6 was replaced with 13 parts by mass of a 5% solution of triethylamine (TEA), conductive composition (10C) was prepared the same as in example 6, and various measurements and evaluations were conducted. The results are shown in Table 5.

Comparative Example 8

Except that a 5% solution of 1,8-diazabicyclo[5.4.0]-7-undecene in example 6 was replaced with 19 parts by mass of a 5% solution of tetraethylammonium compound (TEAH), conductive composition (11C) was prepared the same as in example 6, and various measurements and evaluations were conducted. The results are shown in Table 5.

Comparative Example 9

Except that a 5% solution of 1,8-diazabicyclo[5.4.0]-7-undecene in example 6 was replaced with 2 parts by mass of a 5% solution of ammonia ($NH_3$), conductive composition (12C) was prepared the same as in example 6, and various measurements and evaluations were conducted. The results are shown in Table 5.

Comparative Example 10

Except that a 5% solution of 1,8-diazabicyclo[5.4.0]-7-undecene in example 6 was replaced with 10 parts by mass of a 5% solution of bis(2-dimethylaminoethylether) (BDAEE), conductive composition (13C) was prepared the same as in example 6, and various measurements and evaluations were conducted. The results are shown in Table 5.

TABLE 5

|  |  | example 6 | example 7 | example 8 | example 9 | example 10 | example 11 | example 12 |
|---|---|---|---|---|---|---|---|---|
| conductive composition |  | 1C | 2C | 3C | 4C | 5C | 6C | 7C |
| added base |  | DBU | DBN | DMAP | DMAP | DMAP | DMAP | AP |
| content of basic compound (E1) | [mol %] | 70 | 70 | 50 | 60 | 70 | 80 | 70 |
| surface resistance | [Ω/□] | 5.00E+08 | 5.00E+08 | 2.00E+07 | 1.00E+08 | 1.00E+08 | 9.00E+08 | 2.00E+07 |
| reduction in film thickness | [nm] | 1 | 0 | 4 | −1 | 0 | −1 | 0 |

|  |  | comp. example 5 | comp. example 6 | comp. example 7 | comp. example 8 | comp. example 9 | comp. example 10 |
|---|---|---|---|---|---|---|---|
| conductive composition |  | 8C | 9C | 10C | 11C | 12C | 13C |
| added base |  | — | Py | TEA | TEAH | $NH_3$ | BDAEE |
| content of basic compound (E1) | [mol %] | — | 70 | 70 | 70 | 70 | 70 |
| surface resistance | [Ω/□] | — | 2.00E+07 | 3.00E+08 | 5.00E+09 | 3.00E+06 | — |
| reduction in film thickness | [nm] | 205 | 71 | 6 | 3 | 72 | — |

Abbreviations in Table 5 are as follows:
DBU: 1,8-diazabicyclo[5.4.0]-7-undecene
DBN: 1,5-diazabicyclo[4.3.0]-5-nonene
DMAP: 4-dimethylaminopyridine
AP: aminopyridine
Py: pyridine
TEA: triethylamine
TEAH: tetraethylammonium compound
$NH_3$: ammonia
BDAEE: bis(2-dimethylaminoethylether)

As is clear in Table 5, examples 6 to 12 prepared by adding a basic compound (E1) exhibited excellent conductivity (surface-resistance value is low), and a reduction in the film thickness of the resist layer was lowered.

By contrast, comparative example 6 prepared using a conductive composition that does not contain a basic compound (D1) and comparative examples 7 to 10 prepared by using a basic compound other than the basic compound (E1) showed a significant reduction in film thickness.

Comparative example 8 prepared by adding a basic compound other than the basic compound (E1) showed a relatively small reduction in the film thickness of the resist, but the conductivity of the conductive coating film was insufficient.

From the results above, it is found that the conductive composition of the fourth embodiment exhibits excellent conductivity (surface resistance) and is capable of providing a conductive coating film that is less likely to affect adversely the resist so as to lower a reduction in the film thickness of the resist.

Next, examples of the conductive compositions according to the fifth and sixth embodiments of the present invention are described.

(Evaluation of Coating Performance)

Chemically amplified electron-beam resist was spin-coated (2000 rpm×60 seconds) on a 4-inch silicon wafer (hereinafter referred to as a silicon substrate), and heat was applied on a hot plate at 130° C. for 90 seconds to form a resist layer on the 4-inch silicon wafer. On the resist layer, the conductive composition according to the fifth or sixth embodiment was spin-coated (2000 rpm×60 seconds). The surface condition was visually observed and the coating performance was evaluated according to the following evaluation criteria.

A: no repelling was observed on the surface.
B: repelling was observed on part of the surface.
C: significant repelling was observed.

<Evaluation of Conductivity>

The same method described in the examples of the third embodiment was employed to evaluate conductivity.

<Surface Roughness>

The same method described in the examples of the third embodiment was employed to measure surface roughness (Ra1 value and Ra2 value).

<Reduction in Film Thickness>

The same method described in the examples of the third embodiment was employed to measure the reduction in the film thickness of the resist.

Using the conductive polymer (A-1) obtained in production example 1A and the water-soluble polymer (C-3) obtained in production example 8A, conductive compositions were prepared as follows.

Examples 13 to 15, Comparative Example 11, 12

To 100 parts by mass of a conductive polymer (A1-1) solution (conductive polymer: $8.8 \times 10^{-3}$ mol), a basic compound was added to prepare a conductive composition. The type and content of the basic compound are shown in Table 6. For each of the obtained conductive compositions, surface resistance was measured, coating performance was evaluated, and a reduction in the film thickness of the resist layer was measured. The results are shown in Table 6.

Example 16

To 100 parts by mass of a conductive polymer solution (A1-1) (conductive polymer: $8.8 \times 10^{-3}$ mol), 27 parts by mass of a 5% tetrabutylammonium hydroxide solution (TBAH) as a basic compound (E2) and 0.18 parts by mass of a water-soluble polymer (C-3) were added to prepare conductive composition (4D).

The surface resistance, coating performance and reduction in the film thickness of the resist layer of the obtained conductive composition were measured. The results are shown in Table 6.

Example 17

Conductive composition (5D) was prepared by the same procedure as in example 16 except that TBAH in example 16 was replaced with 21 parts by mass of a 5% solution of tetrapropylammonium hydroxide (TPAH).

The surface resistance, coating performance and reduction in the film thickness of the resist layer of the obtained conductive composition (5D) were measured. The results are shown in Table 6.

Example 18

To 100 parts by mass of a conductive polymer solution (A1-1) (conductive polymer: $8.8 \times 10^{-3}$ mol), 13 parts by mass of tris(hydroxymethyl)aminomethane (Tris) as a basic compound (E3) and 0.18 parts by mass of a water-soluble polymer (C-3) were added to prepare conductive composition (6D).

The surface resistance and reduction in the film thickness of the resist layer of the obtained conductive composition (6D) were measured. The results are shown in Table 6.

Examples 19, 20, Comparative Examples 15 to 19

Conductive compositions were each prepared the same as in example 18 except that the type and content of a basic compound (E3) were respectively changed as shown in Table 6. The surface resistance, coating performance and reduction in the film thickness of the resist layer were measured for each conductive composition. The results are shown in Table 6.

Comparative Example 13

To 100 parts by mass of a conductive polymer solution (A1-1) (conductive polymer: $8.8 \times 10^{-3}$ mol), 9 parts by mass of TPAH (5% solution) as a basic compound (E2) were added to prepare conductive composition (11D).

The surface resistance, coating performance and reduction in the film thickness of the resist layer of the obtained conductive composition (11D) were measured. The results are shown in Table 6.

Comparative Example 14

To 100 parts by mass of a conductive polymer solution (A1-1) (conductive polymer: $8.8 \times 10^{-3}$ mol), 15 parts by mass of TEAR (5% solution) as a basic compound (E2) were added to prepare conductive composition (12D).

The surface resistance, coating performance and reduction in the film thickness of the resist layer of the obtained conductive composition (12D) were measured. The results are shown in Table 6.

TABLE 6

| | conductive composition | basic compound | content of basic compound [mol %] | presence of water-soluble polymer | surface resistance [Ω/□] | coating performance | reduction in film thickness [nm] |
|---|---|---|---|---|---|---|---|
| example 13 | 1D | TBAH | 60 | no | 2.00E+09 | A | 3 |
| example 14 | 2D | TBAH | 70 | no | 4.00E+10 | A | 2 |
| example 15 | 3D | TBAH | 70 | no | 5.80E+09 | A | 3 |
| example 16 | 4D | TBAH | 60 | yes | 8.00E+09 | A | 2 |
| example 17 | 5D | TPAH | 60 | yes | 5.90E+09 | A | 2 |
| example 18 | 6D | Tris | 60 | yes | 1.50E+09 | A | 2 |
| example 19 | 7D | Tris | 70 | yes | 6.50E+09 | A | 1 |
| example 20 | 8D | Tris | 80 | yes | 5.50E+10 | A | 1 |
| comp. example 11 | 9D | TMAH | 70 | no | no data | C | no data |
| comp. example 12 | 10D | TEAH | 70 | no | no data | C | no data |
| comp. example 13 | 11D | TMAH | 60 | yes | 1.30E+09 | A | 4 |
| comp. example 14 | 12D | TEAH | 60 | yes | 3.60E+09 | A | 4 |
| comp. example 15 | 13D | Tris | 30 | yes | 7.60E+07 | A | 6 |
| comp. example 16 | 14D | Tris | 50 | yes | 3.20E+08 | A | 4 |
| comp. example 17 | 15D | Py | 60 | yes | 2.00E+07 | A | 4 |
| comp. example 18 | 16D | TEA | 60 | yes | 1.60E+08 | A | 5 |
| comp. example 19 | 17D | NH$_3$ | 60 | yes | 1.00E+07 | A | 4 |

Abbreviations in Table 6 indicate the following:
TBAH: tetrabutylammonium hydroxide,
TPAH: tetrapropylammonium hydroxide,
TEAH: tetraethylammonium hydroxide,
TMAH: tetramethylammonium hydroxide,
DBN: 1,5-diazabicyclo[4.3.0]-5-nonene,
Tris: tris(hydroxymethyl)aminomethane,
Py: pyridine,
TEA: triethylamine,
NH$_3$: ammonia In Table 6, "content of base" indicates the content of a basic compound (mol equivalent) based on 1 mol of a unit having an acidic group among the monomers of the conductive polymer.

As is clear from Table 6, conductive compositions (1D to 3D) of examples 13 to 15 each prepared by adding a basic compound (E2) exhibited excellent coating performance on the resist layer and high conductivity.

By contrast, conductive compositions (9D) and (10D) of comparative examples 11 and 12 each prepared by adding a quaternary ammonium compound in which four groups bonded to a nitrogen atom are each an alkyl group having 2 or fewer carbon atoms, showed low coating performance. Namely, it was found difficult to form a conductive coating film on the resist layer by using the conductive compositions of comparative examples 11 and 12. Thus, evaluation by film reduction testing was not conducted on comparative examples 11 and 12.

As is clear from Table 6, the conductive compositions of the examples, each prepared by adding a basic compound (E2) or basic compound (E3), showed that acidic substances had caused less reduction (f) in the film thickness of the resist layer.

By contrast, using conductive compositions (13D, 14D) of comparative examples 15 and 16 containing a small amount of a basic compound (E3), and conductive compositions (16D, 17D) of comparative examples 18 and 19 prepared by using TEA or NH$_3$ as a basic compound, the reduction in the film thickness of the resist layer, caused by acidic substances, was significant.

INDUSTRIAL APPLICABILITY

An embodiment of the present invention provides a conductor which exhibits less reduction in the film thickness of the resist layer and excellent surface roughness applicable to a next-generation process for semiconductor devices. Another embodiment of the present invention provides a conductive composition containing a surfactant capable of reducing clogging of a filter used for filtration of the conductive composition. Another embodiment of the present invention provides a conductive composition capable of forming a conductive coating film that has less adverse impact on the substrate and exhibits excellent surface roughness. Also, another embodiment of the present invention provides a conductive composition that exhibits excellent conductivity (surface resistance) and less reduction in the film thickness. Furthermore, another embodiment of the present invention provides a conductive composition capable of forming a conductive coating film that has less adverse impact on the resist layer.

The invention claimed is:
1. A laminate, comprising:
a substrate;
a conductive coating film; and
an electron-beam resist film,
wherein the electron-beam resist film is laminated on at least one surface of the substrate,
the conductive coating film is laminated on the electron-beam resist film,
a surface resistance value of the conductive coating film is $5\times10^{10}$Ω/□ or less,
the conductive coating film has a surface roughness (Ra1) measured by a stylus profiler of 0.7 nm or less,
a surface roughness (Ra2) measured by an optical microscope of 0.35 nm or less, and
the conductive coating film is formed by using a conductive composition comprising a conductive polymer (A).

* * * * *